(12) United States Patent
Sarwer et al.

(10) Patent No.: US 11,425,427 B2
(45) Date of Patent: Aug. 23, 2022

(54) METHOD AND APPARATUS FOR LOSSLESS CODING OF VIDEO DATA

(71) Applicant: ALIBABA GROUP HOLDING LIMITED, Grand Cayman (KY)

(72) Inventors: Mohammed Golam Sarwer, Cupertino, CA (US); Yan Ye, San Diego, CA (US); Jiancong Luo, Skillman, NJ (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/104,722

(22) Filed: Nov. 25, 2020

(65) Prior Publication Data

US 2021/0195251 A1 Jun. 24, 2021

Related U.S. Application Data

(60) Provisional application No. 62/959,220, filed on Jan. 10, 2020, provisional application No. 62/953,466, filed on Dec. 24, 2019.

(51) Int. Cl.
| | |
|---|---|
| *H04N 19/96* | (2014.01) |
| *H04N 19/46* | (2014.01) |
| *H04N 19/157* | (2014.01) |
| *H04N 19/174* | (2014.01) |
| *H04N 19/103* | (2014.01) |
| *H04N 19/60* | (2014.01) |
| *H04N 19/176* | (2014.01) |

(52) U.S. Cl.
CPC ........... *H04N 19/96* (2014.11); *H04N 19/103* (2014.11); *H04N 19/157* (2014.11); *H04N 19/174* (2014.11); *H04N 19/176* (2014.11); *H04N 19/46* (2014.11); *H04N 19/60* (2014.11)

(58) Field of Classification Search
CPC ...... H04N 19/96; H04N 19/46; H04N 19/157; H04N 19/174; H04N 19/103; H04N 19/60; H04N 19/176; H04N 19/70
See application file for complete search history.

(56) References Cited

U.S. PATENT DOCUMENTS

| | | | |
|---|---|---|---|
| 2013/0077696 A1* | 3/2013 | Zhou | H04N 19/61 375/240.24 |
| 2015/0264364 A1 | 9/2015 | Zhang et al. | |

(Continued)

OTHER PUBLICATIONS

Bross et al., "Versatile Video Coding (Draft 7)," JVET-P2001-vE, 16$^{th}$ Meeting: Geneva, CH, Oct. 1-11, 2019, 488 pages.

(Continued)

*Primary Examiner* — Nam D Pham
(74) *Attorney, Agent, or Firm* — Finnegan, Henderson, Farabow, Garrett & Dunner, LLP

(57) ABSTRACT

The present disclosure provides apparatuses and methods for performing lossless coding of a code tree unit (CTU). According to certain disclosed embodiments, the methods include: receiving a bitstream comprising a plurality of coding tree unit (CTUs) in a picture, and determining whether lossless coding is applied to the plurality of CTUs, based on a plurality of flags, respectively. The plurality of flags comprise a first flag associated with a first CTU. The method further includes: in response to a determination that lossless coding is applied to the first CTU, performing lossless coding to the first CTU.

16 Claims, 34 Drawing Sheets

Table 1. Exemplary CTU syntax for signaling whether a CTU is coded in lossless mode

| coding_tree_unit( ) { | Descriptor |
|---|---|
| xCtb = CtbAddrX << CtbLog2SizeY | |
| yCtb = CtbAddrY << CtbLog2SizeY | |
| ctu_lossless_flag[ CtbAddrX ][ CtbAddrY ] | u(1) |
| if( slice_sao_luma_flag \|\| slice_sao_chroma_flag ) | |
| sao( CtbAddrX, CtbAddrY ) | |
| if( slice_alf_enabled_flag ){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( slice_num_alf_aps_ids_luma > 0 ) | |
| alf_use_aps_flag | ae(v) |
| if( alf_use_aps_flag ) { | |
| if( slice_num_alf_aps_ids_luma > 1 ) | |
| alf_luma_prev_filter_idx | ae(v) |
| } else | |
| alf_luma_fixed_filter_idx | ae(v) |
| } | |

501

(56) References Cited

U.S. PATENT DOCUMENTS

2016/0080748 A1     3/2016   Sasai et al.
2017/0180737 A1     6/2017   Ye et al.

OTHER PUBLICATIONS

Bross et al., "AHG18: Enabling lossless coding with minimal impact on VVC design, "JVET-P0606-v2, 16th Meeting: Geneva, CH, Oct. 1-11, 2019, 6 pages.
Chen et al., "Algorithm Description of Joint Exploration Test Model 7 (JEM 7)," JVET-G1001-v1, $7^{th}$ Meeting: Torino, IT, Jul. 13-21, 2017, 50 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
JEM, https://jvet.hhi.fraunhofer.de/svn/svn_HMJEMSoftware.
Segall et al., "Joint Call for Proposals on Video Compression with Capability beyond HEVC," JVET-H1002 (v6), $8^{th}$ Meeting: Macao, CN, Oct. 18-24, 2017, 27 pages.
Sullivan et al., "Overview of the High Efficiency Video Coding (HEVC) Standard," IEE Transactions on Circuits and Systems for Video Technology, vol. 22, No. 12, pp. 1649-1668 (2012).
PCT International Search Report and Written Opinion dated Feb. 11, 2021 issued in corresponding International Application No. PCT/US2020/062233 (16 pgs.).

\* cited by examiner

Table 1: Exemplary CTU syntax for signaling whether a CTU is coded in lossless mode

| coding_tree_unit( ) { | Descriptor |
|---|---|
| xCtb = CtbAddrX << CtbLog2SizeY | |
| yCtb = CtbAddrY << CtbLog2SizeY | |
| *ctu_lossless_flag[ CtbAddrX ][ CtbAddrY ]* | *u(1)* |
| if( slice_sao_luma_flag \|\| slice_sao_chroma_flag ) | |
| sao( CtbAddrX, CtbAddrY ) | |
| if( slice_alf_enabled_flag ){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( slice_num_alf_aps_ids_luma > 0 ) | |
| alf_use_aps_flag | ae(v) |
| if( alf_use_aps_flag ) { | |
| if( slice_num_alf_aps_ids_luma > 1 ) | |
| alf_luma_prev_filter_idx | ae(v) |
| } else | |
| alf_luma_fixed_filter_idx | ae(v) |
| } | |

501 — (marker for ctu_lossless_flag row)

FIG. 5

Table 2: Exemplary SPS syntax table for sps_ctu_lossless_present_flag

| | |
|---|---|
| sps_sao_enabled_flag | u(1) |
| sps_alf_enabled_flag | u(1) |
| *sps_ctu_lossless_present_flag* | *u(1)* |
| *if(sps_ctu_lossless_present_flag == 0)* | |
| sps_transform_skip_enabled_flag | u(1) |
| if( sps_transform_skip_enabled_flag ) | |
| sps_bdpcm_enabled_flag | u(1) |
| if( sps_bdpcm_enabled_flag && chroma_format_idc == 3 ) | |
| sps_bdpcm_chroma_enabled_flag | u(1) |

601 marks the italicized rows.

FIG. 6

Table 3: Exemplary CTU syntax table when sps_ctu_lossless_present_flag is signaled

| | Descriptor |
|---|---|
| coding_tree_unit( ) { | |
| xCtb = CtbAddrX << CtbLog2SizeY | |
| yCtb = CtbAddrY << CtbLog2SizeY | |
| *if(sps_ctu_lossless_present_flag)* | |
| *ctu_lossless_flag[ CtbAddrX ][ CtbAddrY ]* | *u(1)* |
| if( slice_sao_luma_flag \|\| slice_sao_chroma_flag ) | |
| sao( CtbAddrX, CtbAddrY ) | |
| if( slice_alf_enabled_flag ){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( slice_num_alf_aps_ids_luma > 0 ) | |
| alf_use_aps_flag | ae(v) |
| if( alf_use_aps_flag ) { | |
| if( slice_num_alf_aps_ids_luma > 1 ) | |
| alf_luma_prev_filter_idx | ae(v) |
| } else | |
| alf_luma_fixed_filter_idx | ae(v) |
| } | |

701 marks the italicized rows.

FIG. 7

Table 4: Exemplary slice_header syntax of slice level lossless flag

| slice_header( ) { | Descriptor |
|---|---|
|     slice_pic_order_cnt_lsb | u(v) |
|     *slice_lossless_flag* | *u(1)* |
|     *if(slice_lossless_flag == 0 && sps_sao_enabled_flag && !pic_sao_enabled_present_flag )* | |
|     { | |
|         slice_sao_luma_flag | u(1) |
|         if( ChromaArrayType != 0 ) | |
|         slice_sao_chroma_flag | u(1) |
|     } | |
|     if(*slice_lossless_flag == 0 &&* sps_alf_enabled_flag && !pic_alf_enabled_present_flag ) | |
|     { | |
|         slice_alf_enabled_flag | u(1) |
|         if( slice_alf_enabled_flag ) { | |
|             slice_num_alf_aps_ids_luma | u(3) |
|             for( i = 0; i < slice_num_alf_aps_ids_luma; i++ ) | |
|                 slice_alf_aps_id_luma[ i ] | u(3) |
|             if( ChromaArrayType != 0 ) | |
|             slice_alf_chroma_idc | u(2) |
|             if( slice_alf_chroma_idc ) | |
|             slice_alf_aps_id_chroma | u(3) |
|         } | |
|     } | |
|     if( deblocking_filter_override_enabled_flag && | |
|         !pic_deblocking_filter_override_present_flag *&& slice_lossless_flag == 0*) | |
|         slice_deblocking_filter_override_flag | u(1) |
|     if( slice_deblocking_filter_override_flag ) { | |
|         slice_deblocking_filter_disabled_flag | u(1) |
|         if( !slice_deblocking_filter_disabled_flag ) { | |
|             slice_beta_offset_div2 | se(v) |
|             slice_tc_offset_div2 | se(v) |
|         } | |
|     } | |
| } | |

801 — slice_lossless_flag and following if
802 — if(slice_lossless_flag == 0 && ...)
803 — deblocking override condition

FIG. 8

Table 5: Exemplary coding_tree_unit syntax of a method in which CTU level lossless flag is conditionally signaled if slice_lossless_flag is equal to 0

| coding_tree_unit( ) { | Descriptor |
|---|---|
|   xCtb = CtbAddrX << CtbLog2SizeY | |
|   yCtb = CtbAddrY << CtbLog2SizeY | |
|   *if(slice_lossless_flag == 0)* | |
|     ctu_lossless_flag[ CtbAddrX ][ CtbAddrY ] | *u(1)* |
|   if( slice_sao_luma_flag || slice_sao_chroma_flag ) | |
|     sao( CtbAddrX, CtbAddrY ) | |
|   if( slice_alf_enabled_flag ){ | |
|     alf_ctb_flag[ 0 ][ CtbAddrX ][ CtbAddrY ] | ae(v) |
|     if( alf_ctb_flag[ 0 ][ CtbAddrX ][ CtbAddrY ] ) { | |
|       if( slice_num_alf_aps_ids_luma > 0 ) | |
|         alf_use_aps_flag | ae(v) |
|       if( alf_use_aps_flag ) { | |
|         if( slice_num_alf_aps_ids_luma > 1 ) | |
|           alf_luma_prev_filter_idx | ae(v) |
|       } else | |
|         alf_luma_fixed_filter_idx | ae(v) |
|     } | |

Table 6: Exemplary picture header syntax table of picture level lossless coding <Part I>

| picture_header_rbsp( ) { | Descriptor |
|---|---|
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   *pic_lossless_flag* | *u(1)* |
|   if( sps_sao_enabled_flag && *pic_lossless_flag* == 0) { | |
|     pic_sao_enabled_present_flag | u(1) |
|     if( pic_sao_enabled_present_flag ) { | |
|       pic_sao_luma_enabled_flag | u(1) |
|       if(ChromaArrayType != 0 ) | |
|         pic_sao_chroma_enabled_flag | u(1) |
|     } | |
|   } | |
|   if( sps_alf_enabled_flag && *pic_lossless_flag* == 0) { | |
|     pic_alf_enabled_present_flag | u(1) |
|     if( pic_alf_enabled_present_flag ) { | |
|       pic_alf_enabled_flag | u(1) |
|       if( pic_alf_enabled_flag ) { | |
|         pic_num_alf_aps_ids_luma | u(3) |
|         for( i = 0; i < pic_num_alf_aps_ids_luma; i++ ) | |
|           pic_alf_aps_id_luma[ i ] | u(3) |
|         if( ChromaArrayType != 0 ) | |
|           pic_alf_chroma_idc | u(2) |
|         if( pic_alf_chroma_idc ) | |
|           pic_alf_aps_id_chroma | u(3) |
|       } | |
|     } | |
|   } | |

(1001 marks the pic_lossless_flag / sps_sao_enabled_flag block; 1002 marks the sps_alf_enabled_flag block.)

FIG. 10

Table 6: Exemplary picture header syntax table of picture level lossless coding <Part II>

| | |
|---|---|
| 1003  if( deblocking_filter_override_enabled_flag && *pic_lossless_flag* == 0 ) { | |
|     pic_deblocking_filter_override_present_flag | u(1) |
|     if( pic_deblocking_filter_override_present_flag ) { | |
|         pic_deblocking_filter_override_flag | u(1) |
|         if( pic_deblocking_filter_override_flag) { | |
|             pic_deblocking_filter_disabled_flag | u(1) |
|             if( !pic_deblocking_filter_disabled_flag ) { | |
|                 pic_beta_offset_div2 | se(v) |
|                 pic_tc_offset_div2 | se(v) |
|                 } | |
|         } | |
|     } | |
| } | |
| 1004  if( sps_lmcs_enabled_flag && *pic_lossless_flag* == 0 ) { | |
|     pic_lmcs_enabled_flag | u(1) |
|     if( pic_lmcs_enabled_flag ) { | |
|         pic_lmcs_aps_id | u(2) |
|         if( ChromaArrayType != 0 ) | |
|             pic_chroma_residual_scale_flag | u(1) |
|         } | |
|     } | |
| } | |

FIG. 10 (continued)

Table 7: Exemplary slice header syntax table when pic_lossless_flag is signaled

| slice_header( ) { | Descriptor |
|---|---|
| slice_pic_order_cnt_lsb | u(v) |
| if (pic_lossless_flag == 0) | |
| slice_lossless_flag | u(1) |
| } | |

1101 marks the rows: `if (pic_lossless_flag == 0)` and `slice_lossless_flag`.

FIG. 11

Table 8: Exemplary PPS syntax table with pps_lossless_flag

| pic_parameter_set_rbsp( ) { | Descriptor |
|---|---|
| pps_pic_parameter_set_id | ue(v) |
| pps_seq_parameter_set_id | u(4) |
| pic_width_in_luma_samples | ue(v) |
| pic_height_in_luma_samples | ue(v) |
| pps_lossless_flag | u(1) |
| if (pps_lossless_flag) | |
| deblocking_filter_control_present_flag | u(1) |
| if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|         pps_beta_offset_div2 | se(v) |
|         pps_tc_offset_div2 | se(v) |
|     } | |
| } | |
| } | |

1201 marks the rows: `pps_lossless_flag` and `if (pps_lossless_flag)`.

FIG. 12

Table 9: Exemplary picture header syntax table when pps_lossless_flag is signaled <Part I>

| picture_header_rbsp( ) { | Descriptor |
|---|---|
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   *if (pps_lossless_flag == 0)* | |
|     *pic_lossless_flag* | *u(1)* |
|   if( sps_sao_enabled_flag && *pic_lossless_flag == 0*) { | |
|     pic_sao_enabled_present_flag | u(1) |
|     if( pic_sao_enabled_present_flag ) { | |
|       pic_sao_luma_enabled_flag | u(1) |
|       if(ChromaArrayType != 0 ) | |
|         pic_sao_chroma_enabled_flag | u(1) |
|     } | |
|   } | |
|   if( sps_alf_enabled_flag && *pic_lossless_flag == 0*) { | |
|     pic_alf_enabled_present_flag | u(1) |
|     if( pic_alf_enabled_present_flag ) { | |
|       pic_alf_enabled_flag | u(1) |
|       if( pic_alf_enabled_flag ) { | |
|         pic_num_alf_aps_ids_luma | u(3) |
|         for( i = 0; i < pic_num_alf_aps_ids_luma; i++ ) | |
|           pic_alf_aps_id_luma[ i ] | u(3) |
|         if( ChromaArrayType != 0 ) | |
|           pic_alf_chroma_idc | u(2) |
|         if( pic_alf_chroma_idc ) | |
|           pic_alf_aps_id_chroma | u(3) |
|       } | |
|     } | |
|   } | |

FIG. 13

Table 9: Exemplary picture header syntax table when pps_lossless_flag is signaled <Part II>

| | | |
|---|---|---|
| 1303 | if( deblocking_filter_override_enabled_flag && *pic_lossless_flag == 0*) { | |
| |     pic_deblocking_filter_override_present_flag | u(1) |
| |     if( pic_deblocking_filter_override_present_flag ) { | |
| |         pic_deblocking_filter_override_flag | u(1) |
| |         if( pic_deblocking_filter_override_flag) { | |
| |             pic_deblocking_filter_disabled_flag | u(1) |
| |             if( !pic_deblocking_filter_disabled_flag ) { | |
| |                 pic_beta_offset_div2 | se(v) |
| |                 pic_tc_offset_div2 | se(v) |
| |             } | |
| |         } | |
| |     } | |
| | } | |
| 1304 | if( sps_lmcs_enabled_flag && *pic_lossless_flag == 0* ) { | |
| |     pic_lmcs_enabled_flag | u(1) |
| |     if( pic_lmcs_enabled_flag ) { | |
| |         pic_lmcs_aps_id | u(2) |
| |         if( ChromaArrayType != 0 ) | |
| |             pic_chroma_residual_scale_flag | u(1) |
| |     } | |
| |     } | |
| | } | |

FIG. 13 (continued)

Table 10: Exemplary SPS syntax table for sequence level lossless coding <Part I>

| seq_parameter_set_rbsp( ) { | Descriptor |
|---|---|
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   sps_seq_parameter_set_id | u(4) |
|   chroma_format_idc | u(2) |
|   if( chroma_format_idc == 3 ) | |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   sps_log2_ctu_size_minus5 | u(2) |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
|   sps_subpic_id_present_flag | u(1) |
|   if( sps_subpics_id_present_flag ) { | |
|     sps_subpic_id_signalling_present_flag | u(1) |
|     if( sps_subpics_id_signalling_present_flag ) { | |
|       sps_subpic_id_len_minus1 | ue(v) |
|       for( i = 0; i <= sps_num_subpics_minus1; i++ ) | |
|         sps_subpic_id[ i ] | u(v) |
|     } | |
|   } | |

FIG. 14

Table 10: Exemplary SPS syntax table for sequence level lossless coding <Part II>

| | |
|---|---|
| bit_depth_minus8 | ue(v) |
| min_qp_prime_ts_minus4 | ue(v) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|    poc_msb_len_minus1 | ue(v) |
| if( sps_max_sublayers_minus1 > 0 ) | |
|    sps_sublayer_dpb_params_flag | u(1) |
| if( sps_ptl_dpb_hrd_params_present_flag ) | |
|    dpb_parameters( 0, sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|    num_ref_pic_lists_in_sps[ i ] | ue(v) |
|    for( j = 0; j < num_ref_pic_lists_in_sps[ i ]; j++) | |
|      ref_pic_list_struct( i, j ) | |
| } | |
| if( ChromaArrayType != 0 ) | |
|    qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|    sps_log2_diff_max_bt_min_qt_intra_slice_luma | ue(v) |
|    sps_log2_diff_max_tt_min_qt_intra_slice_luma | ue(v) |
| } | |
| if( sps_max_mtt_hierarchy_depth_inter_slice != 0 ) { | |
|    sps_log2_diff_max_bt_min_qt_inter_slice | ue(v) |
|    sps_log2_diff_max_tt_min_qt_inter_slice | ue(v) |
| } | |

FIG. 14 (continued)

Table 10: Exemplary SPS syntax table for sequence level lossless coding <Part III>

| | |
|---|---|
| if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|         sps_log2_diff_max_bt_min_qt_intra_slice_chroma | ue(v) |
|         sps_log2_diff_max_tt_min_qt_intra_slice_chroma | ue(v) |
|     } | |
| } | |
| sps_lossless_flag [1401] | *u(1)* |
| *if(sps_lossless_flag == 0) {* | |
|     sps_max_luma_transform_size_64_flag | u(1) |
|     sps_joint_cbcr_enabled_flag | u(1) |
| } | |
| if( ChromaArrayType != 0 ) { | |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|         qp_table_start_minus26[ i ] | se(v) |
|         num_points_in_qp_table_minus1[ i ] | ue(v) |
|         for( j = 0; j <= num_points_in_qp_table_minus1[ i ]; j++ ) { | |
|             delta_qp_in_val_minus1[ i ][ j ] | ue(v) |
|             delta_qp_diff_val[ i ][ j ] | ue(v) |
|         } | |
|     } | |
| } | |
| *if(sps_lossless_flag == 0) {* [1402] | |
|     sps_sao_enabled_flag | u(1) |
|     sps_alf_enabled_flag | u(1) |
|     sps_transform_skip_enabled_flag | u(1) |
| *}* [1403] | |
| if( sps_transform_skip_enabled_flag ) | |
|     sps_bdpcm_enabled_flag | u(1) |
| if( sps_bdpcm_enabled_flag && chroma_format_idc == 3 ) | |
|     sps_bdpcm_chroma_enabled_flag | u(1) |
| sps_ref_wraparound_enabled_flag | u(1) |
| if( sps_ref_wraparound_enabled_flag ) | |
|     sps_ref_wraparound_offset_minus1 | ue(v) |
| sps_temporal_mvp_enabled_flag | u(1) |

FIG. 14 (continued)

Table 10: Exemplary SPS syntax table for sequence level lossless coding <Part IV>

| | |
|---|---|
| if( sps_temporal_mvp_enabled_flag ) | |
|     sps_sbtmvp_enabled_flag | u(1) |
| sps_amvr_enabled_flag | u(1) |
| sps_bdof_enabled_flag | u(1) |
| if( sps_bdof_enabled_flag ) | |
|     sps_bdof_pic_present_flag | u(1) |
| sps_smvd_enabled_flag | u(1) |
| sps_dmvr_enabled_flag | u(1) |
| if( sps_dmvr_enabled_flag) | |
|     sps_dmvr_pic_present_flag | u(1) |
| sps_mmvd_enabled_flag | u(1) |
| *if(sps_lossless_flag == 0) {*    (1404) | |
|     sps_isp_enabled_flag | u(1) |
| } | |
| sps_mrl_enabled_flag | u(1) |
| sps_mip_enabled_flag | u(1) |
| if( ChromaArrayType != 0 ) | |
|     sps_cclm_enabled_flag | u(1) |
| if( chroma_format_idc == 1 ) { | |
|     sps_chroma_horizontal_collocated_flag | u(1) |
|     sps_chroma_vertical_collocated_flag | u(1) |
| } | |
| *if(sps_lossless_flag == 0)*    (1405) | |
|     sps_mts_enabled_flag | u(1) |
| if( sps_mts_enabled_flag ) { | |
|     sps_explicit_mts_intra_enabled_flag | u(1) |
|     sps_explicit_mts_inter_enabled_flag | u(1) |
| } | |
| *if(sps_lossless_flag == 0) {*    (1406) | |
|     sps_sbt_enabled_flag | u(1) |
| sps_affine_enabled_flag | u(1) |
| if( sps_affine_enabled_flag ) { | |
|     sps_affine_type_flag | u(1) |
|     sps_affine_amvr_enabled_flag | u(1) |
|     sps_affine_prof_enabled_flag | u(1) |
|     if( sps_affine_prof_enabled_flag ) | |
|         sps_prof_pic_present_flag | u(1) |
| } | |

FIG. 14 (continued)

Table 10: Exemplary SPS syntax table for sequence level lossless coding <Part V>

| | |
|---|---|
| if( chroma_format_idc == 3 ) { | |
|     sps_palette_enabled_flag | u(1) |
|     sps_act_enabled_flag | u(1) |
| } | |
| sps_bcw_enabled_flag | u(1) |
| sps_ibc_enabled_flag | u(1) |
| sps_ciip_enabled_flag | u(1) |
| if( sps_mmvd_enabled_flag ) | |
|     sps_fpel_mmvd_enabled_flag | u(1) |
| sps_triangle_enabled_flag | u(1) |
| *if(sps_lossless_flag == 0) {* | |
|     sps_lmcs_enabled_flag | u(1) |
|     sps_lfnst_enabled_flag | u(1) |
| *}* | |
| sps_ladf_enabled_flag | u(1) |
| if( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|         sps_ladf_qp_offset[ i ] | se(v) |
|         sps_ladf_delta_threshold_minus1[ i ] | ue(v) |
|     } | |
| } | |
| sps_scaling_list_enabled_flag | u(1) |
| sps_loop_filter_across_virtual_boundaries_disabled_present_flag | u(1) |
| if( sps_loop_filter_across_virtual_boundaries_disabled_present_flag ) { | |
|     sps_num_ver_virtual_boundaries | u(2) |
|     for( i = 0; i < sps_num_ver_virtual_boundaries; i++ ) | |
|         sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|         sps_virtual_boundaries_pos_y[ i ] | u(13) |
| } | |

1407 — *if(sps_lossless_flag == 0) {*
1408 — *}*

FIG. 14 (continued)

Table 10: Exemplary SPS syntax table for sequence level lossless coding <Part VI>

| | |
|---|---|
| if( sps_ptl_dpb_hrd_params_present_flag ) { | |
|    sps_general_hrd_params_present_flag | u(1) |
|    if( sps_general_hrd_params_present_flag ) { | |
|       general_hrd_parameters( ) | |
|       if( sps_max_sublayers_minus1 > 0 ) | |
|          sps_sublayer_cpb_params_present_flag | u(1) |
|       firstSubLayer = sps_sublayer_cpb_params_present_flag ? 0 : sps_max_sublayers_minus1 | |
|       ols_hrd_parameters( firstSubLayer, sps_max_sublayers_minus1 ) | |
|    } | |
| } | |
| field_seq_flag | u(1) |
| vui_parameters_present_flag | u(1) |
| if( vui_parameters_present_flag ) | |
|    vui_parameters( ) /* Specified in ITU-T H.SEI | ISO/IEC 23002-7 */ | |
| sps_extension_flag | u(1) |
| if( sps_extension_flag ) | |
|    while( more_rbsp_data( ) ) | |
|       sps_extension_data_flag | u(1) |
| rbsp_trailing_bits( ) | |
| } | |

FIG. 14 (continued)

Table 11: Exemplary coding_tree_unit syntax table of CTU level residual coding flag

| coding_tree_unit( ) { | Descriptor |
|---|---|
| xCtb = CtbAddrX << CtbLog2SizeY | |
| yCtb = CtbAddrY << CtbLog2SizeY | |
| *ctu_lossless_flag[ CtbAddrX ][ CtbAddrY ]* | *u(1)* |
| *if(ctu_lossless_flag[ CtbAddrX ][ CtbAddrY ])* | |
| *ctu_rrc_flag[ CtbAddrX ][ CtbAddrY ]* | *u(1)* |
| if( slice_sao_luma_flag \|\| slice_sao_chroma_flag ) | |
| sao( CtbAddrX, CtbAddrY ) | |
| if( slice_alf_enabled_flag ){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( slice_num_alf_aps_ids_luma > 0 ) | |
| alf_use_aps_flag | ae(v) |
| if( alf_use_aps_flag ) { | |
| if( slice_num_alf_aps_ids_luma > 1 ) | |
| alf_luma_prev_filter_idx | ae(v) |
| } else | |
| alf_luma_fixed_filter_idx | ae(v) |
| } | |

1501 (marking the ctu_lossless_flag / ctu_rrc_flag rows)

FIG. 15

Table 12: Exemplary transform_unit syntax of CTU level residual coding flag

| transform_unit( x0, y0, tbWidth, tbHeight, treeType, subTuIndex, chType ) { | Descriptor |
|---|---|
| ... | |
|   if( tu_cbf_luma[ x0 ][ y0 ] && treeType != DUAL_TREE_CHROMA ) { | |
|     if( sps_transform_skip_enabled_flag && !BdpcmFlag[ x0 ][ y0 ][ 0 ] && <br>       tbWidth <= MaxTsSize && tbHeight <= MaxTsSize && <br>       ( IntraSubPartitionsSplit[ x0 ][ y0 ] == ISP_NO_SPLIT ) && !cu_sbt_flag ) | |
|       transform_skip_flag[ x0 ][ y0 ][ 0 ] | ae(v) |
| 1601     if( !transform_skip_flag[ x0 ][ y0 ][ 0 ] \|\| *ctu_rrc_flag[ CtbAddrX ][ CtbAddrY ]*) | |
|       residual_coding( x0, y0, Log2( tbWidth ), Log2( tbHeight ), 0 ) | |
|     else | |
|       residual_ts_coding( x0, y0, Log2( tbWidth ), Log2( tbHeight ), 0 ) | |
|   } | |
|   if( tu_cbf_cb[ xC ][ yC ] && treeType != DUAL_TREE_LUMA ) { | |
|     if( sps_transform_skip_enabled_flag && !BdpcmFlag[ x0 ][ y0 ][ 1 ] && <br>       wC <= MaxTsSize && hC <= MaxTsSize && !cu_sbt_flag ) | |
|       transform_skip_flag[ xC ][ yC ][ 1 ] | ae(v) |
| 1602     if( !transform_skip_flag[ xC ][ yC ][ 1 ] \|\| *ctu_rrc_flag[ CtbAddrX ][ CtbAddrY ]*) | |
|       residual_coding( xC, yC, Log2( wC ), Log2( hC ), 1 ) | |
|     else | |
|       residual_ts_coding( xC, yC, Log2( wC ), Log2( hC ), 1 ) | |
|   } | |
|   if( tu_cbf_cr[ xC ][ yC ] && treeType != DUAL_TREE_LUMA && <br>     !( tu_cbf_cb[ xC ][ yC ] && tu_joint_cbcr_residual_flag[ xC ][ yC ] ) ) { | |
|     if( sps_transform_skip_enabled_flag && !BdpcmFlag[ x0 ][ y0 ][ 2 ] && <br>       wC <= MaxTsSize && hC <= MaxTsSize && !cu_sbt_flag ) | |
|       transform_skip_flag[ xC ][ yC ][ 2 ] | ae(v) |
| 1603     if( !transform_skip_flag[ xC ][ yC ][ 2 ] \|\| *ctu_rrc_flag[ CtbAddrX ][ CtbAddrY ]*) | |
|       residual_coding( xC, yC, Log2( wC ), Log2( hC ), 2 ) | |
|     else | |
|       residual_ts_coding( xC, yC, Log2( wC ), Log2( hC ), 2 ) | |
|   } | |
| } | |

FIG. 16

- Edges that are at the boundary of the picture,
- Edges that coincide with the boundaries of a subpicture for which loop_filter_across_subpic_enabled_flag[ SubPicIdx ] is equal to 0,
- Edges that coincide with the virtual boundaries of the picture when VirtualBoundariesDisabledFlag is equal to 1,
- Edges that coincide with tile boundaries when loop_filter_across_tiles_enabled_flag is equal to 0,
- Edges that coincide with slice boundaries when loop_filter_across_slices_enabled_flag is equal to 0,
- Edges that coincide with upper or left boundaries of slices with slice_deblocking_filter_disabled_flag equal to 1,
- Edges within slices with slice_deblocking_filter_disabled_flag equal to 1, 1701
- *Edges that coincide with upper or left boundaries of coding tree unit with ctu_lossless_flag equal to 1,*
- *Edges within a coding tree unit with ctu_lossless_flag equal to 1.*

- Edges that do not correspond to 4×4 sample grid boundaries of the luma component,
- Edges that do not correspond to 8×8 sample grid boundaries of the chroma component,
- Edges within the luma component for which both sides of the edge have intra_bdpcm_luma_flag equal to 1,
- Edges within the chroma components for which both sides of the edge have intra_bdpcm_chroma_flag equal to 1,
- Edges of chroma subblocks that are not edges of the associated transform unit.

FIG. 17

Table 13: Exemplary coding_tree_unit syntax table to disable SAO

| coding_tree_unit( ) { | Descriptor |
|---|---|
| xCtb = CtbAddrX << CtbLog2SizeY | |
| yCtb = CtbAddrY << CtbLog2SizeY | |
| *ctu_lossless_flag[ CtbAddrX ][ CtbAddrY ]* | *u(1)* |
| *if(ctu_lossless_flag[ CtbAddrX ][ CtbAddrY ])* | |
| *ctu_rrc_flag[ CtbAddrX ][ CtbAddrY ]* | *u(1)* |
| *if(ctu_lossless_flag[ CtbAddrX ][ CtbAddrY ] == 0 && ( slice_sao_luma_flag \|\| slice_sao_chroma_flag ))* | |
| sao( CtbAddrX, CtbAddrY ) | |
| if( slice_alf_enabled_flag ){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( slice_num_alf_aps_ids_luma > 0 ) | |
| alf_use_aps_flag | ae(v) |
| if( alf_use_aps_flag ) { | |
| if( slice_num_alf_aps_ids_luma > 1 ) | |
| alf_luma_prev_filter_idx | ae(v) |
| } else | |
| alf_luma_fixed_filter_idx | ae(v) |
| } | |

Table 14: Exemplary coding_tree_unit syntax to disable ALF

| coding_tree_unit( ) { | Descriptor |
|---|---|
| xCtb = CtbAddrX << CtbLog2SizeY | |
| yCtb = CtbAddrY << CtbLog2SizeY | |
| *ctu_lossless_flag[ CtbAddrX ][ CtbAddrY ]* | *u(1)* |
| *if(ctu_lossless_flag[ CtbAddrX ][ CtbAddrY ])* | |
|   *ctu_rrc_flag[ CtbAddrX ][ CtbAddrY ]* | *u(1)* |
| If(ctu_lossless_flag[ CtbAddrX ][ CtbAddrY ] == 0 && ( slice_sao_luma_flag \|\| slice_sao_chroma_flag )) | |
|   sao( CtbAddrX, CtbAddrY ) | |
| if( slice_alf_enabled_flag && ctu_lossless_flag[ CtbAddrX ][ CtbAddrY ] == 0){ | |
|   alf_ctb_flag[ 0 ][ CtbAddrX ][ CtbAddrY ] | ae(v) |
|   if( alf_ctb_flag[ 0 ][ CtbAddrX ][ CtbAddrY ] ) { | |
|     if( slice_num_alf_aps_ids_luma > 0 ) | |
|     alf_use_aps_flag | ae(v) |
|     if( alf_use_aps_flag ) { | |
|       if( slice_num_alf_aps_ids_luma > 1 ) | |
|       alf_luma_prev_filter_idx | ae(v) |
|     } else | |
|     alf_luma_fixed_filter_idx | ae(v) |
|   } | |
|   if( slice_alf_chroma_idc == 1 \|\| slice_alf_chroma_idc == 3 ) { | |
|     alf_ctb_flag[ 1 ][ CtbAddrX ][ CtbAddrY ] | ae(v) |
|     if( alf_ctb_flag[ 1 ][ CtbAddrX ][ CtbAddrY ] && aps_alf_chroma_num_alt_filters_minus1 > 0 ) | |
|     alf_ctb_filter_alt_idx[ 0 ][ CtbAddrX ][ CtbAddrY ] | ae(v) |
|   } | |
|   if( slice_alf_chroma_idc == 2 \|\| slice_alf_chroma_idc == 3 ) { | |
|     alf_ctb_flag[ 2 ][ CtbAddrX ][ CtbAddrY ] | ae(v) |
|     if( alf_ctb_flag[ 2 ][ CtbAddrX ][ CtbAddrX ] && aps_alf_chroma_num_alt_filters_minus1 > 0 ) | |
|     alf_ctb_filter_alt_idx[ 1 ][ CtbAddrX ][ CtbAddrX ] | ae(v) |
|   } | |
| } | |

FIG. 19

- If pic_lmcs_enabled_flag of the slice that contains the luma sample lumaSample is equal to 1
2001 *and ctu_lossless_flag[ xCtb >> CtbLog2SizeY ][ yCtb >> CtbLog2SizeY ] is equal to zero*, the following ordered steps apply:

1. The variable idxYInv is derived by invoking the identification of piece-wise function index process for a luma sample as specified in clause 8.8.2.3 with lumaSample as the input and idxYInv as the output.

2. The variable invSample is derived as follows:

invSample = InputPivot[ idxYInv ] + ( InvScaleCoeff[ idxYInv ] *
                   ( lumaSample − LmcsPivot[ idxYInv ] ) + ( 1 << 10 ) ) >> 11

3. The inverse mapped luma sample invLumaSample is derived as follows:

invLumaSample = Clip1( invSample )

- Otherwise, invLumaSample is set equal to lumaSample.

FIG. 20

- If one of the following conditions is true, chroma residual coding do not apply:
   - pic_chroma_residual_scale_flag is equal to 0.
   - nCurrSw * nCurrSh is less than or euqal to 4.
   - tu_cbf_cb [ xCurr ][ yCurr ] is equal to 0 and tu_cbf_cr [ xCurr ][ yCurr ] is equal to 0.
2101  - *ctu_lossless_flag[ xCtb >> CtbLog2SizeY ][ yCtb >> CtbLog2SizeY ] is equal to 1*
- Otherwise, chroma residual scaling is applied.

FIG. 21

Table 15: Exemplary coding unit syntax of a method to disable SBT for lossless CTU

| | |
|---|---|
| if( CuPredMode[ chType ][ x0 ][ y0 ] = = MODE_INTER && sps_sbt_enabled_flag<br>&& !ciip_flag[ x0 ][ y0 ] && !MergeTriangleFlag[ x0 ][ y0 ]<br>&& cbWidth <= MaxTbSizeY && cbHeight <= MaxTbSizeY &&<br>*ctu_lossless_flag[ CtbAddrX ][ CtbAddrY ] == 0*) { | |
| allowSbtVerH = cbWidth >= 8 | |
| allowSbtVerQ = cbWidth >= 16 | |
| allowSbtHorH = cbHeight >= 8 | |
| allowSbtHorQ = cbHeight >= 16 | |
| if( allowSbtVerH || allowSbtHorH ) | |
|    cu_sbt_flag | ae(v) |
| if( cu_sbt_flag ) { | |
|    if( ( allowSbtVerH || allowSbtHorH ) && ( allowSbtVerQ || allowSbtHorQ ) ) | |
|      cu_sbt_quad_flag | ae(v) |
|    if( ( cu_sbt_quad_flag && allowSbtVerQ && allowSbtHorQ ) ||<br>     ( !cu_sbt_quad_flag && allowSbtVerH && allowSbtHorH ) ) | |
|      cu_sbt_horizontal_flag | ae(v) |
|      cu_sbt_pos_flag | ae(v) |
| } | |

Table 16: Exemplary coding unit syntax to disable MTS of the lossless CTU

| | |
|---|---|
| if( treeType != DUAL_TREE_CHROMA && lfnst_idx == 0 &&<br>transform_skip_flag[ x0 ][ y0 ][ 0 ] == 0 && Max( cbWidth, cbHeight ) <= 32 &&<br>IntraSubPartitionsSplit[ x0 ][ y0 ] == ISP_NO_SPLIT && cu_sbt_flag == 0 &&<br>MtsZeroOutSigCoeffFlag == 1 && tu_cbf_luma[ x0 ][ y0 ] ) { | |
| if( ( ( CuPredMode[ chType ][ x0 ][ y0 ] == MODE_INTER &&<br>   sps_explicit_mts_inter_enabled_flag ) ||<br>   ( CuPredMode[ chType ][ x0 ][ y0 ] == MODE_INTRA &&<br>   sps_explicit_mts_intra_enabled_flag ) ) && *ctu_lossless_flag[ CtbAddrX ][ CtbAddrY ]<br>== 0*) | |
|    mts_idx | ae(v) |

Table 17: Exemplary coding unit syntax to disable LFNST for a lossless CTU

| | |
|---|---|
| lfnstWidth = ( treeType == DUAL_TREE_CHROMA ) ? cbWidth / SubWidthC : ( ( IntraSubPartitionsSplitType == ISP_VER_SPLIT ) ? cbWidth / NumIntraSubPartitions : cbWidth ) | |
| lfnstHeight = ( treeType == DUAL_TREE_CHROMA ) ? cbHeight / SubHeightC : ( ( IntraSubPartitionsSplitType == ISP_HOR_SPLIT) ? cbHeight / NumIntraSubPartitions : cbHeight ) | |
| if( Min( lfnstWidth, lfnstHeight ) >= 4 && sps_lfnst_enabled_flag == 1 && CuPredMode[ chType ][ x0 ][ y0 ] == MODE_INTRA && transform_skip_flag[ x0 ][ y0 ][ 0 ] == 0 && ( treeType != DUAL_TREE_CHROMA \|\| !intra_mip_flag[ x0 ][ y0 ] \|\| Min( lfnstWidth, lfnstHeight ) >= 16 ) && Max( cbWidth, cbHeight ) <= MaxTbSizeY && *ctu_lossless_flag[ CtbAddrX ][ CtbAddrY ] == 0*) { | |
|   if( ( IntraSubPartitionsSplitType != ISP_NO_SPLIT \|\| LfnstDcOnly == 0 ) && LfnstZeroOutSigCoeffFlag == 1 ) | |
|     lfnst_idx | ae(v) |
| } | |

2401 marks the added line.

FIG. 24

Table 18: Part of transform unit syntax table to disable joint_cr_cr mode

| | |
|---|---|
| if( sps_joint_cbcr_enabled_flag && ( ( CuPredMode[ chType ][ x0 ][ y0 ] == MODE_INTRA && ( tu_cbf_cb[ xC ][ yC ] \|\| tu_cbf_cr[ xC ][ yC ] ) ) \|\| ( tu_cbf_cb[ xC ][ yC ] && tu_cbf_cr[ xC ][ yC ] ) ) && chromaAvailable && *ctu_lossless_flag[ CtbAddrX ][ CtbAddrY ] == 0* ) | |
|   tu_joint_cbcr_residual_flag[ xC ][ yC ] | ae(v) |

2501 marks the added condition.

FIG. 25

Table 19: Exemplary coding unit syntax table to disable ISP mode for a lossless CTU

| | |
|---|---|
| if(ctu_lossless_flag[ CtbAddrX ][ CtbAddrY ] == 0 && sps_isp_enabled_flag && intra_luma_ref_idx[ x0 ][ y0 ] == 0 && ( cbWidth <= MaxTbSizeY && cbHeight <= MaxTbSizeY ) && ( cbWidth * cbHeight > MinTbSizeY * MinTbSizeY ) && !cu_act_enabled_flag ) | |
|     intra_subpartitions_mode_flag[ x0 ][ y0 ] | ae(v) |
|     if( intra_subpartitions_mode_flag[ x0 ][ y0 ] == 1 ) | |
|         intra_subpartitions_split_flag[ x0 ][ y0 ] | ae(v) |
| if( intra_luma_ref_idx[ x0 ][ y0 ] == 0 ) | |
|     intra_luma_mpm_flag[ x0 ][ y0 ] | ae(v) |
| if( intra_luma_mpm_flag[ x0 ][ y0 ] ) { | |
|     if( intra_luma_ref_idx[ x0 ][ y0 ] == 0 ) | |
|         intra_luma_not_planar_flag[ x0 ][ y0 ] | ae(v) |
|     if( intra_luma_not_planar_flag[ x0 ][ y0 ] ) | |
|         intra_luma_mpm_idx[ x0 ][ y0 ] | ae(v) |
| } else | |
|     intra_luma_mpm_remainder[ x0 ][ y0 ] | ae(v) |

FIG. 26

Table 20: Exemplary transform unit syntax of transform_skip_flag signaling

| transform_unit( x0, y0, tbWidth, tbHeight, treeType, subTuIndex, chType ) { | Descriptor |
|---|---|
| ... | |
| 2701  if( *ctu_lossless_flag[ CtbAddrX ][ CtbAddrY ]* == 0 && tu_cbf_luma[ x0 ][ y0 ] && treeType != DUAL_TREE_CHROMA ) { | |
|    if( sps_transform_skip_enabled_flag && !BdpcmFlag[ x0 ][ y0 ][ 0 ] && tbWidth <= MaxTsSize && tbHeight <= MaxTsSize && ( IntraSubPartitionsSplit[ x0 ][ y0 ] == ISP_NO_SPLIT ) && !cu_sbt_flag ) | |
|      transform_skip_flag[ x0 ][ y0 ][ 0 ] | ae(v) |
| 2702  if( !transform_skip_flag[ x0 ][ y0 ][ 0 ] \|\| *ctu_rrc_flag[ CtbAddrX ][ CtbAddrY ]*) | |
|    residual_coding( x0, y0, Log2( tbWidth ), Log2( tbHeight ), 0 ) | |
|   else | |
|    residual_ts_coding( x0, y0, Log2( tbWidth ), Log2( tbHeight ), 0 ) | |
| } | |
| 2703  if( *ctu_lossless_flag[ CtbAddrX ][ CtbAddrY ]* == 0 && tu_cbf_cb[ xC ][ yC ] && treeType != DUAL_TREE_LUMA ) { | |
|    if( sps_transform_skip_enabled_flag && !BdpcmFlag[ x0 ][ y0 ][ 1 ] && wC <= MaxTsSize && hC <= MaxTsSize && !cu_sbt_flag ) | |
|      transform_skip_flag[ xC ][ yC ][ 1 ] | ae(v) |
| 2704  if( !transform_skip_flag[ xC ][ yC ][ 1 ] \|\| *ctu_rrc_flag[ CtbAddrX ][ CtbAddrY ]*) | |
|    residual_coding( xC, yC, Log2( wC ), Log2( hC ), 1 ) | |
|   else | |
|    residual_ts_coding( xC, yC, Log2( wC ), Log2( hC ), 1 ) | |
| } | |
| 2705  if( *ctu_lossless_flag[ CtbAddrX ][ CtbAddrY ]* == 0 && tu_cbf_cr[ xC ][ yC ] && treeType != DUAL_TREE_LUMA && !( tu_cbf_cb[ xC ][ yC ] && tu_joint_cbcr_residual_flag[ xC ][ yC ] ) ) { | |
|    if( sps_transform_skip_enabled_flag && !BdpcmFlag[ x0 ][ y0 ][ 2 ] && wC <= MaxTsSize && hC <= MaxTsSize && !cu_sbt_flag ) | |
|      transform_skip_flag[ xC ][ yC ][ 2 ] | ae(v) |
| 2706  if( !transform_skip_flag[ xC ][ yC ][ 2 ] \|\| *ctu_rrc_flag[ CtbAddrX ][ CtbAddrY ]*) | |
|    residual_coding( xC, yC, Log2( wC ), Log2( hC ), 2 ) | |
|   else | |
|    residual_ts_coding( xC, yC, Log2( wC ), Log2( hC ), 2 ) | |
| } | |
| } | |

FIG. 27

Table 21: Exemplary CTU syntax table of the proposed method

| coding_tree_unit( ) { | Descriptor |
|---|---|
| xCtb = CtbAddrX << CtbLog2SizeY | |
| yCtb = CtbAddrY << CtbLog2SizeY | |
| if( slice_sao_luma_flag \|\| slice_sao_chroma_flag ) | |
| sao( CtbAddrX, CtbAddrY ) | |
| if( slice_alf_enabled_flag ){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( slice_num_alf_aps_ids_luma > 0 ) | |
| alf_use_aps_flag | ae(v) |
| if( alf_use_aps_flag ) { | |
| if( slice_num_alf_aps_ids_luma > 1 ) | |
| alf_luma_prev_filter_idx | ae(v) |
| } else | |
| alf_luma_fixed_filter_idx | ae(v) |
| } | |
| if( slice_alf_chroma_idc == 1 \|\| slice_alf_chroma_idc == 3 ) { | |
| alf_ctb_flag[ 1 ][ CtbAddrX ][ CtbAddrY ] | ae(v) |
| if( alf_ctb_flag[ 1 ][ CtbAddrX ][ CtbAddrY ] && aps_alf_chroma_num_alt_filters_minus1 > 0 ) | |
| alf_ctb_filter_alt_idx[ 0 ][ CtbAddrX ][ CtbAddrY ] | ae(v) |
| } | |
| if( slice_alf_chroma_idc == 2 \|\| slice_alf_chroma_idc == 3 ) { | |
| alf_ctb_flag[ 2 ][ CtbAddrX ][ CtbAddrY ] | ae(v) |
| if( alf_ctb_flag[ 2 ][ CtbAddrX ][ CtbAddrX ] && aps_alf_chroma_num_alt_filters_minus1 > 0 ) | |
| alf_ctb_filter_alt_idx[ 1 ][ CtbAddrX ][ CtbAddrX ] | ae(v) |
| } | |
| } | |
| *if (pic_lmcs_enabled_flag){* | |
| *lmcs_ctb_luma_flag[ CtbAddrX ][ CtbAddrY ]* | *ae(v)* |
| *if(pic_chroma_residual_scale_flag){* | |
| *lmcs_ctb_chroma_residual_scale_flag[ CtbAddrX ][ CtbAddrY ]* | *ae(v)* |
| *}* | |
| *}* | |
| .. | |

Table 22: Exemplary slice header syntax of the proposed method

| slice_header( ) { | Descriptor |
|---|---|
| if (pic_lmcs_enabled_flag){ | |
|    slice_lmcs_luma_enabled_flag | u(1) |
|   if (pic_chroma_residual_scale_flag) | |
|    slice_lmcs_chroma_residual_scale_flag | u(1) |
| } | |
| | |

FIG. 30

METHOD AND APPARATUS FOR LOSSLESS CODING OF VIDEO DATA

CROSS-REFERENCE TO RELATED APPLICATIONS

The present disclosure claims priority to U.S. Provisional Application No. 62/953,466, filed on Dec. 24, 2019, and U.S. provisional application No. 62/959,220, filed on Jan. 10, 2020, both of which are incorporated herein by reference in their entireties.

TECHNICAL FIELD

The present disclosure generally relates to video processing, and more particularly, to methods and apparatuses for performing lossless coding of a code tree unit (CTU).

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

In some embodiments, an exemplary video processing method includes: receiving a bitstream comprising a plurality of coding tree unit (CTUs) in a picture, and determining whether lossless coding is applied to the plurality of CTUs, based on a plurality of flags, respectively. The plurality of flags comprise a first flag associated with a first CTU. The method further includes: in response to a determination that lossless coding is applied to the first CTU, performing lossless coding to the first CTU.

In some embodiments, an exemplary video processing apparatus includes at least one memory for storing instructions and at least one processor. The at least one processor is configured to execute the instructions to cause the apparatus to perform: receiving a bitstream comprising a plurality of coding tree unit (CTUs) in a picture, and determining whether lossless coding is applied to the plurality of CTUs, based on a plurality of flags, respectively. The plurality of flags comprise a first flag associated with a first CTU. The at least one processor is configured to execute the instructions to cause the apparatus to further perform: in response to a determination that lossless coding is applied to the first CTU, performing lossless coding to the first CTU.

In some embodiments, an exemplary non-transitory computer readable storage medium stores a set of instructions. The set of instructions are executable by one or more processing devices to cause a video processing apparatus to perform: receiving a bitstream comprising a plurality of coding tree unit (CTUs) in a picture, and determining whether lossless coding is applied to the plurality of CTUs, based on a plurality of flags, respectively. The plurality of flags comprise a first flag associated with a first CTU. The set of instructions are executable by one or more processing devices to cause a video processing apparatus to perform: in response to a determination that lossless coding is applied to the first CTU, performing lossless coding to the first CTU.

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 illustrates an exemplary Table 1 showing exemplary coding tree unit (CTU) syntax for signaling whether a CTU is coded in lossless mode, according to some embodiments of the present disclosure.

FIG. 6 illustrates an exemplary Table 2 showing exemplary sequence-parameter-set (SPS) syntax using syntax element sps_ctu_lossless_present_flag, according to some embodiments of the present disclosure.

FIG. 7 illustrates an exemplary Table 3 showing exemplary CTU syntax for using syntax element sps_ctu_lossless_present_flag, according to some embodiments of the present disclosure.

FIG. 8 illustrates an exemplary Table 4 showing exemplary slice_header syntax of slice level lossless flag, according to some embodiments of the present disclosure.

FIG. 9 illustrates an exemplary Table 5 showing exemplary coding_tree_unit syntax, according to some embodiments of the present disclosure.

FIG. 10 illustrates an exemplary Table 6 showing exemplary picture header syntax for picture level lossless coding, according to some embodiments of the present disclosure.

FIG. 11 illustrates an exemplary Table 7 showing exemplary slice header syntax using pic_lossless_flag, according to some embodiments of the present disclosure.

FIG. 12 illustrates an exemplary Table 8 showing exemplary PPS syntax using pps_lossless_flag, according to some embodiments of the present disclosure.

FIG. 13 illustrates an exemplary Table 9 showing exemplary picture header syntax using pps_lossless_flag, according to some embodiments of the present disclosure.

FIG. 14 illustrates an exemplary Table 10 showing exemplary SPS syntax table sequence level lossless coding, according to some embodiments of the present disclosure.

FIG. 15 illustrates an exemplary Table 11 showing exemplary coding_tree_unit syntax using CTU level residual coding flag, according to some embodiments of the present disclosure.

FIG. 16 illustrates an exemplary Table 12 showing exemplary transform_unit syntax using CTU level residual coding flag, according to some embodiments of the present disclosure.

FIG. 17 illustrates exemplary types of edges to which deblocking filter process is not applied, according to some embodiments of the present disclosure.

FIG. 18 illustrates an exemplary Table 13 showing exemplary coding_tree_unit syntax for disabling sample adaptive offset (SAO), according to some embodiments of the present disclosure.

FIG. 19 illustrates an exemplary Table 14 showing exemplary coding_tree_unit syntax for disabling adaptive loop filter (ALF), according to some embodiments of the present disclosure.

FIG. 20 illustrates an exemplary derivation of variable invLumaSample, according to some embodiments of the present disclosure.

FIG. 21 illustrates exemplary conditions to enable/disable chroma residual scaling, according to some embodiments of the present disclosure.

FIG. 22 illustrates an exemplary Table 15 showing exemplary coding unit syntax for disabling sub-block transform (SBT) for a lossless CTU, according to some embodiments of the present disclosure.

FIG. 23 illustrates an exemplary Table 16 showing exemplary coding unit syntax for disabling multiple-transform selection (MTS) of a lossless CTU, according to some embodiments of the present disclosure.

FIG. 24 illustrates an exemplary Table 17 showing exemplary coding unit syntax for disabling low frequency non-separable transform (LFNST) for a lossless CTU, according to some embodiments of the present disclosure.

FIG. 25 illustrates an exemplary Table 18 showing exemplary transform unit syntax for disabling a joint_cr_cr mode, according to some embodiments of the present disclosure.

FIG. 26 illustrates an exemplary Table 19 showing exemplary coding unit syntax for disabling Intra Subpartition (ISP) mode for a lossless CTU, according to some embodiments of the present disclosure.

FIG. 27 illustrates an exemplary Table 20 showing exemplary transform unit syntax for transform_skip_flag signaling, according to some embodiments of the present disclosure.

FIG. 29 illustrates an exemplary Table 21 showing exemplary syntax for controlling llama mapping with chroma scaling (LMCS) at the CTB level, according to some embodiments of the present disclosure.

FIG. 30 illustrates an exemplary Table 22 showing exemplary slice header syntax for signaling LMCS control flags, according to some embodiments of the present disclosure.

DETAILED DESCRIPTION

Figure 1:
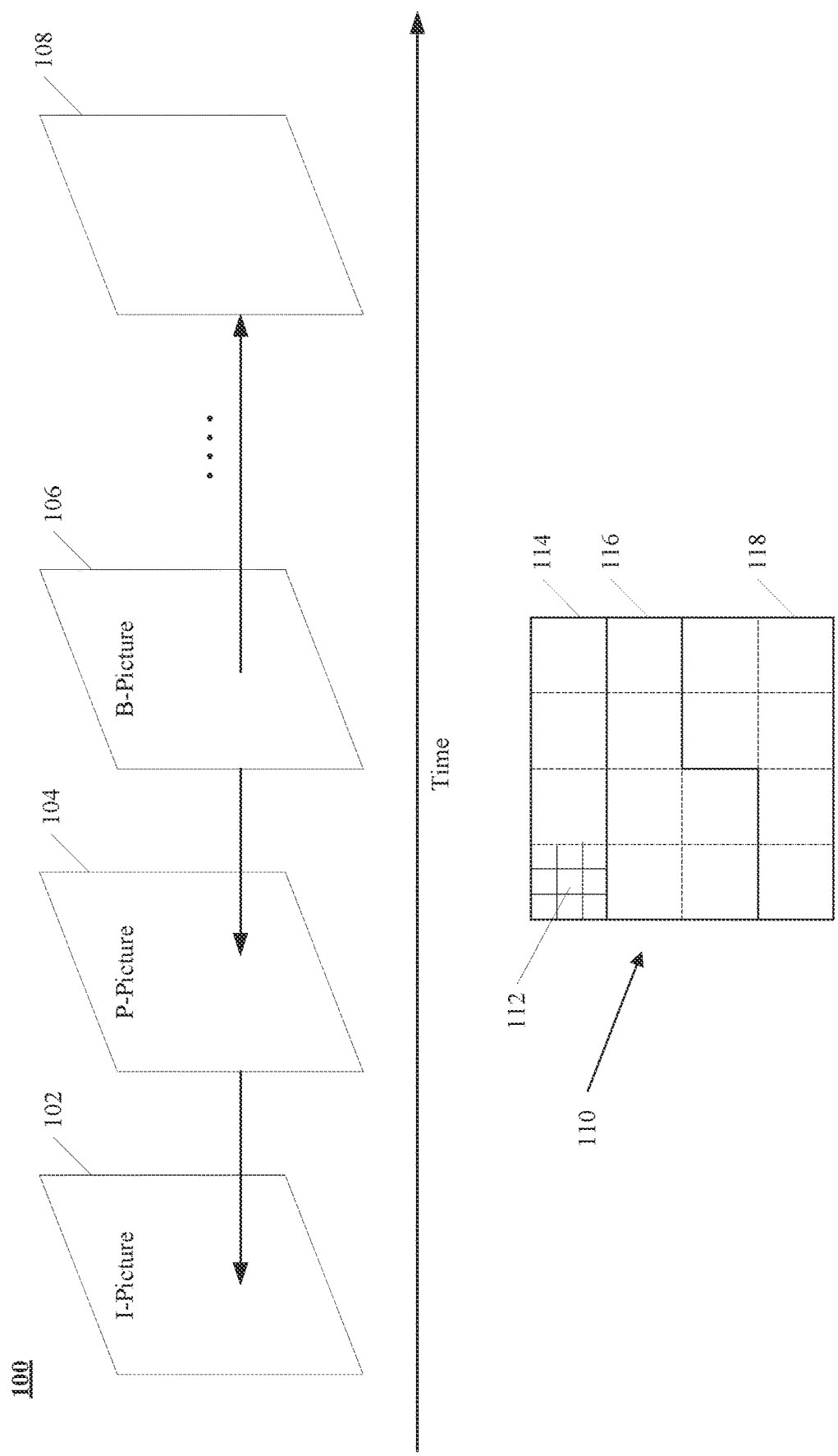
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32>32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure, in some embodiments, the basic processing s units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its lura and chroma components. It should be noted that such division can be performed to further levels depending on processing needs. It should also be noted that different stages can divide the basic processing units using different schemes.

Figure 2A:
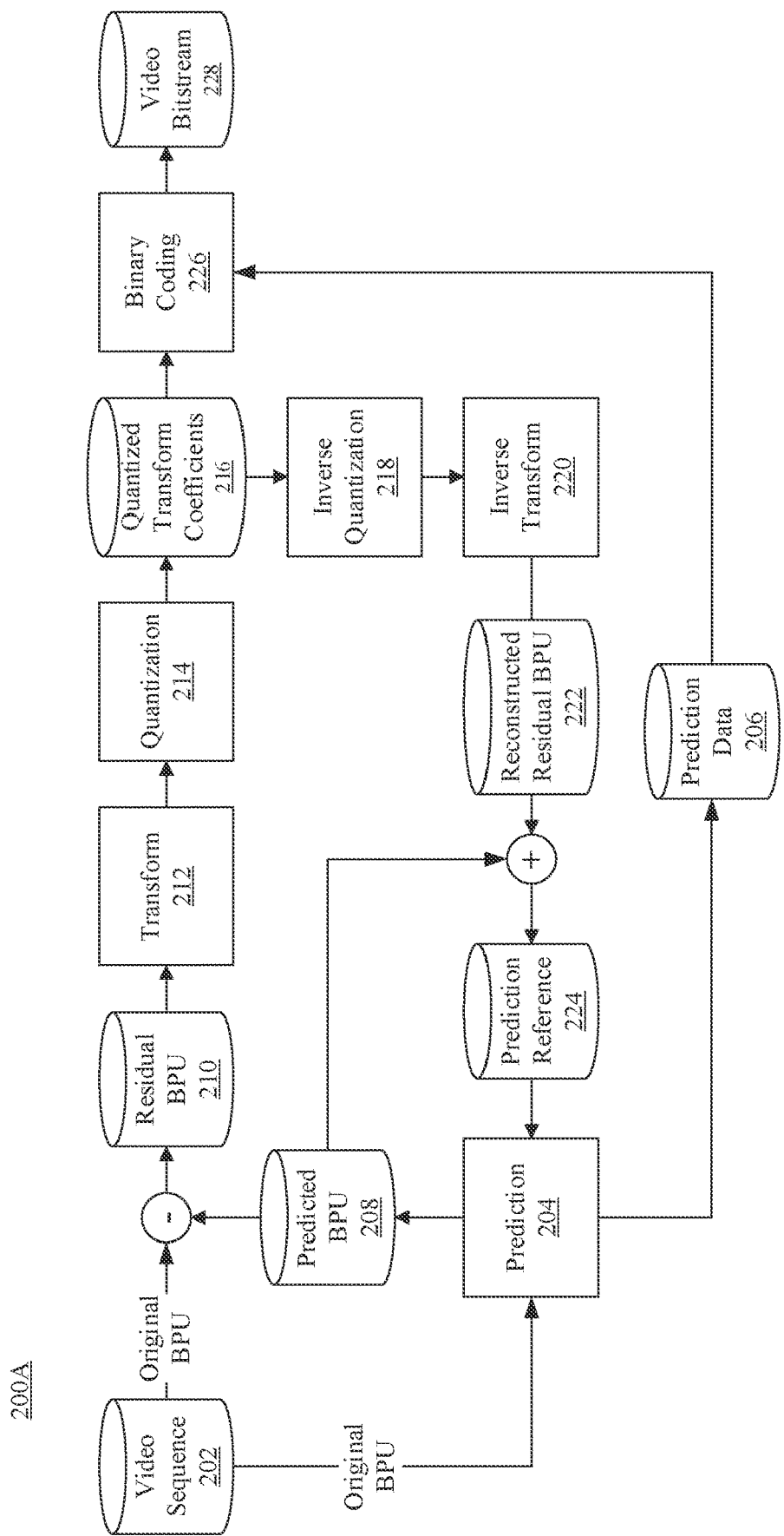
FIG. 2A is a schematic diagram illustrating an exemplary encoding process of a hybrid video coding system, consistent with embodiments of the disclosure.
Figure 2B:
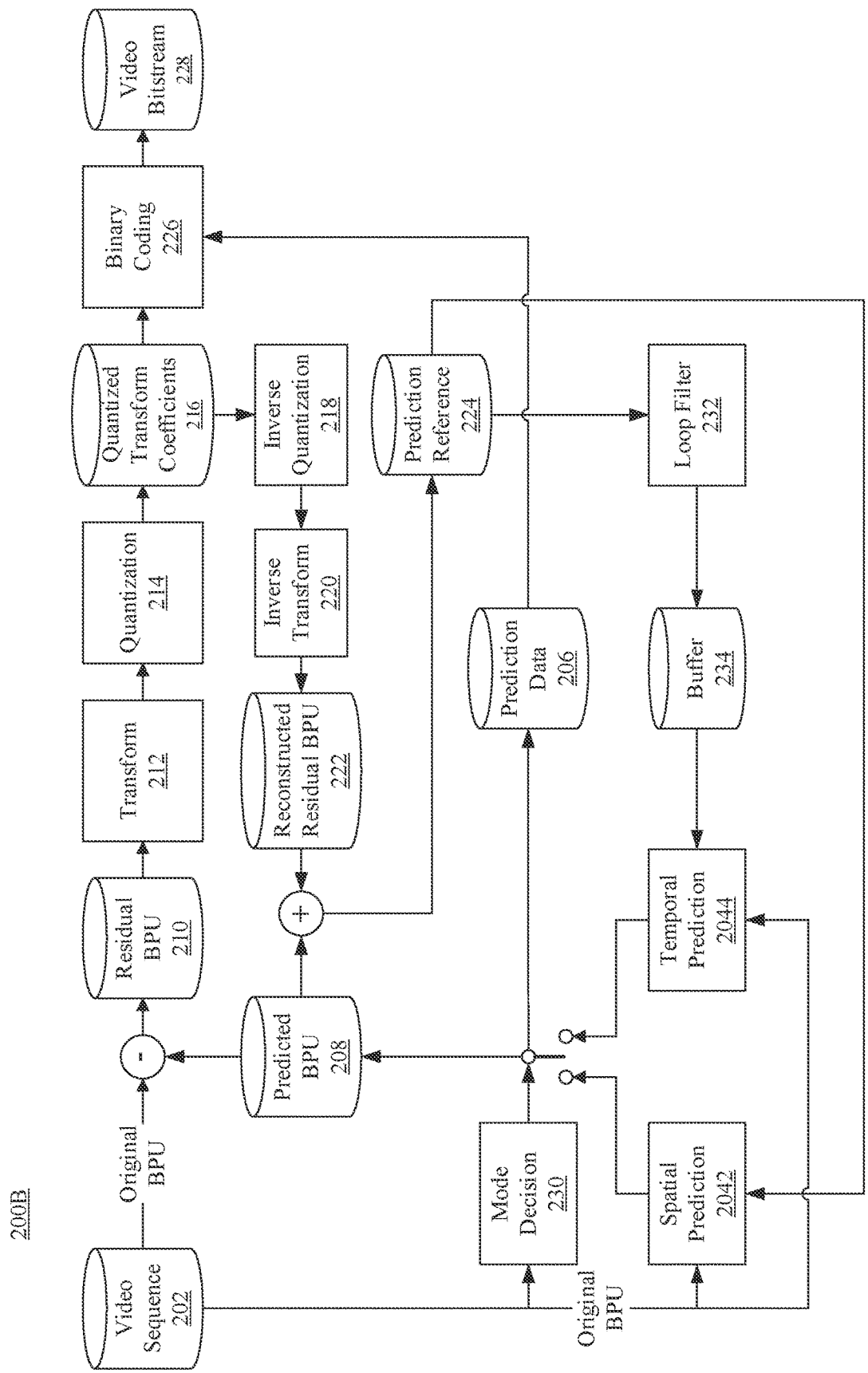
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H266/VVC), at the level of which the transform operation can be performed. It should be noted that the division schemes of the same basic processing sub-unit can be different at the prediction stage and the transform stage. For example, in H.265/HEVC or H266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstructresidual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be loss-. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044, For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like in some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
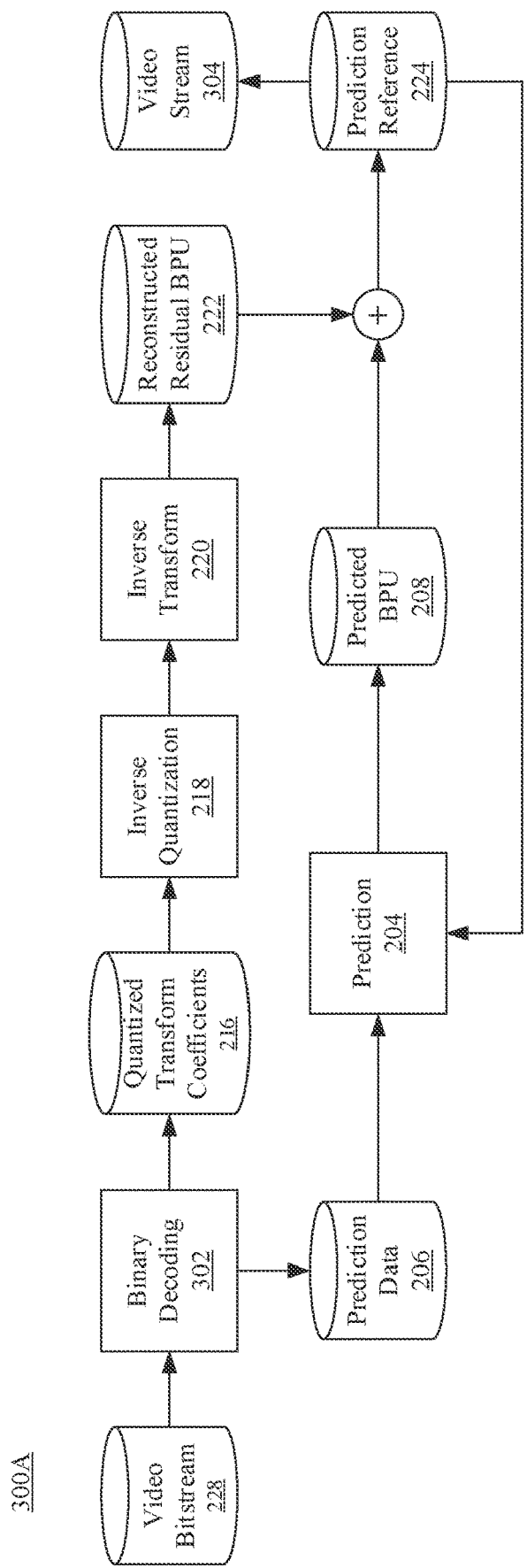
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
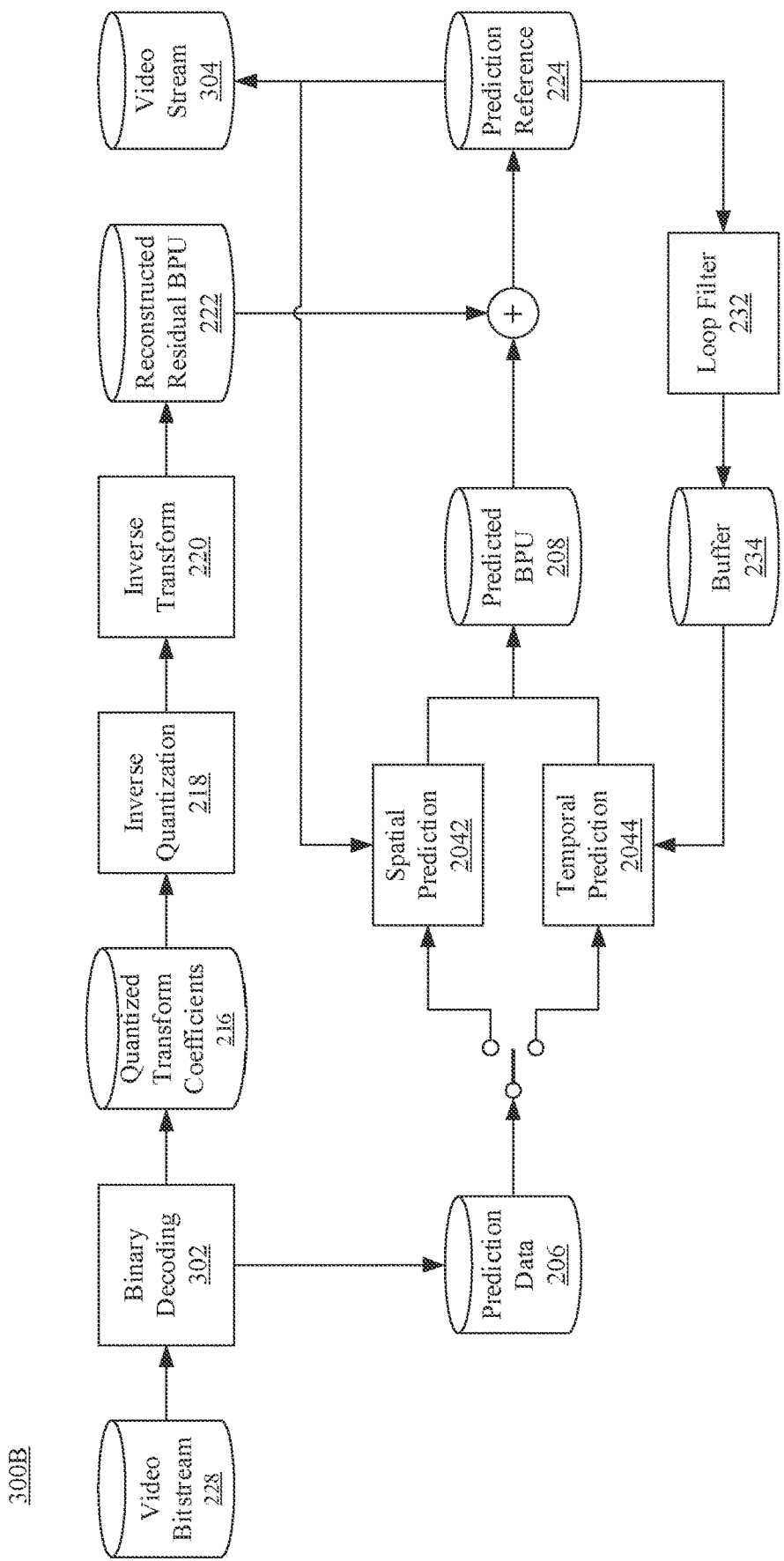
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture) If the current BPU is decoded using the inter prediction at temporal prediction stage 2044, after generating prediction reference 224 (e.g., a reference picture in which all BPU have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
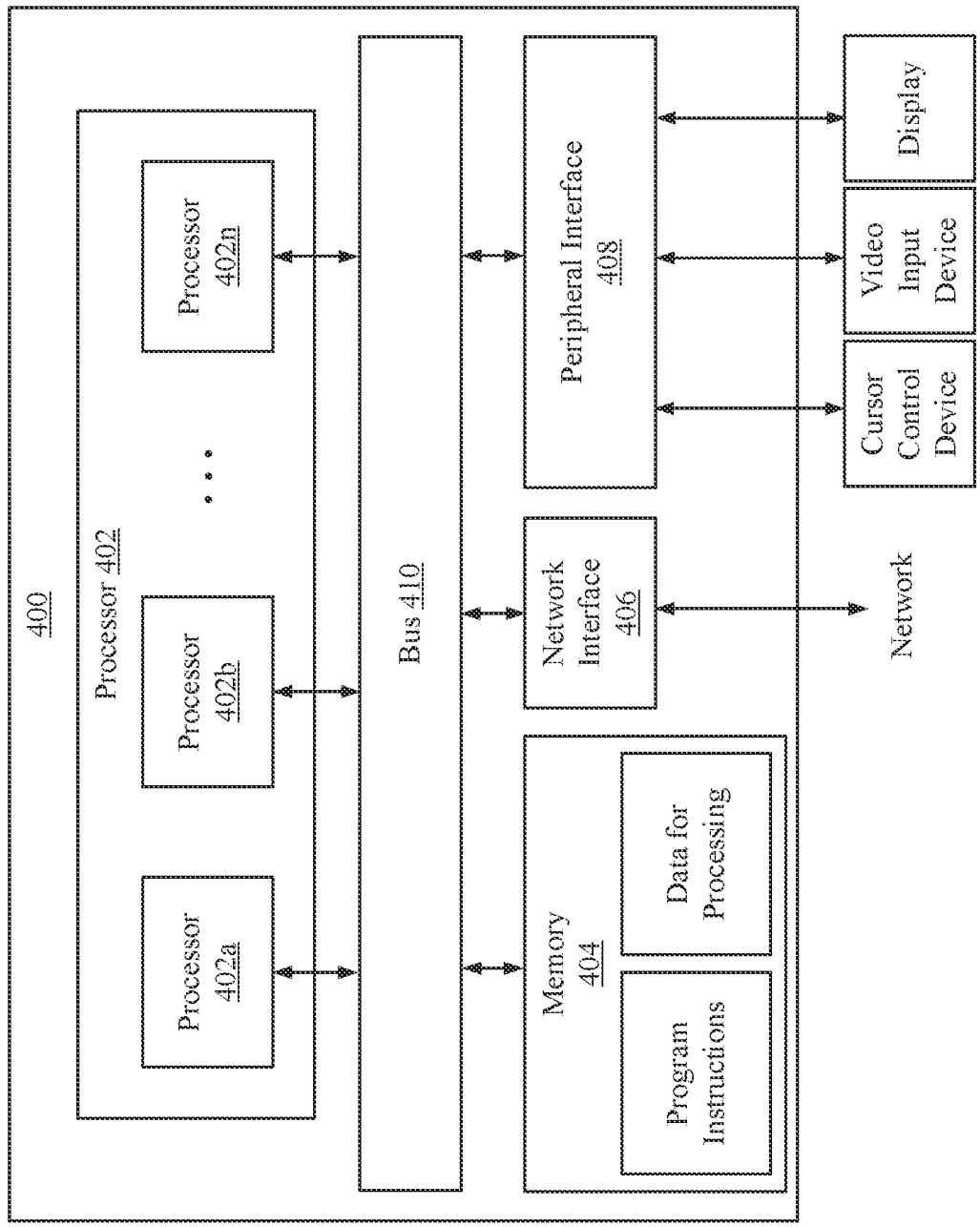
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("ITU"), a microcontroller unit ("MCU"), an optical processor, a programmable logic controller, a microcontroller, a microprocessor, a digital signal processor, an intellectual property (IP) core, a Programmable bogie Array (PIA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice may be signaled at the high level, for example, using init_qp_minus26_syntax element in the Picture Parameter Set (PPS) and using slice_qp_delta syntax element in the slice header. Further, the QP values may be adapted at the local level for each CU using delta QP values sent at the granularity of quantization groups.

According to some embodiments, lossless coding can be achieved at sequence level by selecting the transform-skip mode for all of the coding blocks. In order to achieve the lossless coding at sequence level, several coding tools need to be configured as the following:

Set maximum transform size to 32×32
Enable chroma transform skip
Disable dependent quantization
Disable sub-block transform (SBT)
Disables lura mapping with chroma scaling (LMCS)
Disables de-blocking filer (DF)
Disables sample adaptive offset (SAO)
Disables adaptive loop filter (ALF)
Disable multiple-transform selection (NITS)
Disable low frequency non-separable transform (LFNST)
Disable joint Cb-Cr mode
InternalBitDepth=0 (Input=Internal Bit Depth)

However, in the current design of lossless coding of VVC 7, the above coding tools are configured at sequence level, and thus the coding efficiency is compromised in mixed coding scenario where one part of the image is coded as lossless mode and another part of the image is coded as lossy mode.

To achieve efficient compression in mixed coding (e.g., lossy and lossless coding) scenario, the present disclosure provides methods that signal a flag for each coding tree unit (CTU) of an image frame to indicate whether the CTU is coded in in a lossless mode or a lossy mode.

According to some embodiments, a CTU level lossless flag can be used to signal whether lossless coding is applied to a CTU. Specifically, a flag is signaled at each CTU to indicate if the CTU is coded as lossless mode or not. The following are the semantics of the disclosed CTU level lossless flag, consistent with the present embodiments:

---
ctu_lossless_flag[ xCtb >> CtbLog2SizeY ][ yCtb >> CtbLog2SizeY ] equal to 1 specifies that the coding tree unit at luma location ( xCtb, yCtb ) is losslessly coded.
ctu_losslessflag[ xCtb >> CtbLog2SizeY ][ yCtb >> CtbLog2SizeY ] equal to 0 specifies that the coding tree unit at luma location ( xCtb, yCtb ) is not coded as lossless mode.
When ctu_lossless_flag[ xCtb >> CtbLog2SizeY ][ yCtb >> CtbLog2SizeY ] is not present, it is inferred to be equal to 0.
The variable CtbLog2SizeY is derived as: folCtbLog2SizeY = sps_log2_ctu_size_minus5 + 5.

---

FIG. 5 illustrates an exemplary Table 1 showing exemplary CTU syntax for signaling whether a CTU is coded in lossless mode, according to some embodiments of the present disclosure. Referring to Table 1, the CTU level lossless flag (e.g., ctu_lossless_flag[CtbAddrX][CtbAddrY]) is signaled at the beginning of each CTU. The italicized syntax elements in box 501 show the difference of the proposed method with current VVC 7 syntax table.

According to some embodiments, an SPS level flag is signaled to indicate whether the CTU level lossless flags are present in the bit-stream or not. The following are the semantics of the disclosed SPS flag, consistent with the present embodiments:

---
sps_ctu_lossless_present_flag equal to 1 specifies that ctu_lossless_flag is present in the bitstream. If sps_ctu_lossless_present_flag is equal to 1, sps_transform_skip_enabled_flag is inferred to be 1.
sps_ctu_lossless_present_flag equal to 0 specifies that ctu_lossless_flag is not present in the bitstream.
If sps_ctu_lossless_present_flag is not presents, it is inferred to be 0.

---

FIG. 6 illustrates an exemplary Table 2 showing exemplary SPS syntax for syntax element sps_ctu_lossless_present_flag, according to some embodiments of the present disclosure. Table 2 shows an exemplary SPS syntax table when sps_ctu_lossless_present_flag is signaled in the SPS (emphases shown in box 601 and in italics). In the disclosed method, syntax element sps_transform_skip_enabled_flag is signaled only when syntax element sps_ctu_lossless_present_flag is equal to 0. FIG. 7 illustrates an exemplary Table 3 showing exemplary CTU syntax table when syntax element sps_ctu_lossless_present_flag is signaled, according to some embodiments of the present disclosure. Table 3 shows the coding_tree_unit syntax table where the syntax element ctu_lossless_flag is conditionally signaled if SPS level syntax element sps_ctu_lossless_present_flag is 1 (emphases shown in box 701 and in italics).

According to some embodiments, a slice level lossless flag can be used to signal whether lossless coding is applied, Specifically, the lossless flag is signaled in the slice header. The following are the semantics of the disclosed slice level lossless flag, consistent with the present embodiments:

---
slice_lossless_flag equal to 1 specifies that all of the CTUs of the slice are coded as lossless mode.
slice_lossless_flag equal to 0 specifies that the CTU level lossless flag of the slices are signaled.

---

If slice_lossless_flag is equal to 1, the lossy coding tools such as de-blocking filter, adaptive loop filter, sample adaptive offset, Luma mapping with chroma scaling (LMCS) are disabled, as follows:

Disable de-blocking: If slice_lossless_flag is equal to 1, slice_deblocking_filter_disabled_flag is inferred to be 1.

Disable SAO and ALF: If slice_lossless_flag is equal to 1, slice_sao_luma_flag, slice_sao_chroma_flag, slice_alf_enabled_flag are inferred to be 0.

Disable LMCS and other coding tools: If slice_lossless_flag is equal to 1, the CTU level lossless flags ctu_lossless_flag of all of the CTUs of the slice are inferred to be 1 and LMCS (since there is no slice level control flag to disable LMCS) and other required coding tools are disabled at CTU level.

FIG. 8 illustrates an exemplary Table 4 showing exemplary slice_header syntax of slice level lossless flag (emphases shown in boxes 801-803 and in italics), according to some embodiments of the present disclosure. FIG. 9 illustrates an exemplary Table 5 showing exemplary coding_tree_unit syntax of slice level lossless coding (emphases shown in box 901 and in italics), according to some embodiments of the present disclosure. In Table 5, it is shown that the CTU level lossless flag is conditionally signaled if syntax element slice_lossless_flag is equal to 0. If the syntax element slice_lossless_flag is equal to 1, the CTU level lossless flags ctu_lossless_flag is inferred to be 1.

According to some embodiments, a picture header can be used to signal whether lossless coding is applied. Specifically, the lossless flag is signaled in the picture header (PH). The following are the semantics of the disclosed picture level lossless flag, consistent with the present embodiments:

---
pic_lossless_flag equal to 1 specifies that all of the slices associated with the PH are coded as lossless mode. If pic_lossless_flag equal to 1, the slice level lossless flags slice_lossless_flag of all of the slices associated with the PH are inferred to be 1.
pic_lossless_flag equal to 0 specifies slice_lossless_flag may be present in the bit-stream.

---

If pic_lossless_flag is equal to 1, the following applies:

Disable de-blocking: If pic_lossless_flag is equal to 1, pic_deblocking_filter_disabled_flag is inferred to be 1.

Disable SAO: If pic_lossless_flag is equal to 1, pic_sao_enabled_present_flag, pic_sao_luma_enabled_flag, pic_sao_chroma_enabled_flag are inferred to be 0.

Disable ALF: If pic_lossless_flag is equal to 1, pic_alf_enabled_present_flag and pic_alf_enabled_flag are inferred to be 0.

Disable LMCS: If pic_lossless_flag is equal to 1, pic_lmcs_enabled_flag and pic_chroma_residual_scale_flag are inferred to be 0.

Disable other coding tools: If pic_lossless_flag is equal to 1, the slice level flags of all of the slices associated with the PH are inferred to be 1. In addition, all of the CTU level lossless flags are also inferred to be 1. The other necessary coding tools are disabled at CTU level.

FIG. 10 illustrates an exemplary Table 6 showing exemplary picture header syntax table of picture level lossless coding (emphases shown in boxes 1001-1004 and in italics), according to some embodiments of the present disclosure. FIG. 11 illustrates an exemplary Table 7 showing exemplary slice header syntax table of picture level lossless coding when pic_lossless_flag is signaled (emphases shown in box 1101 and in italics), according to some embodiments of the present disclosure.

According to some embodiments, picture parameter set can be used to signal whether lossless coding is applied.

Specifically, the lossless flag can be signaled in picture parameter sets (PPS). The following are the semantics of the disclosed PPS level lossless flag, consistent with the present embodiments:

--- pps_lossless_flag equal to 1 specifies that all of the slices referring to the PPS is coded as lossless mode. If pps_lossless_flag is equal to 1, the pps_deblocking_filter_disabled_flag is inferred to be 1.
pps_lossless_flag equal to 0 specifies that the slices referring to the PPS is not coded as lossless mode.

---

If syntax element pps_lossless_flag is equal to 1, both the picture level lossless flags pic_lossless_flag and the slice level lossless flags slice_lossless_flag of all of the slices referred to that PPS are inferred to be 1. The CTU level lossless flags associated with that PPS are also inferred to be 1. Therefore, other coding tools may be disabled at CTU level.

FIG. 12 illustrates an exemplary Table 8 showing exemplary PPS syntax table with pps_lossless_flag of PPS level lossless coding (emphases shown in box 1201 and in italics), according to some embodiments of the present disclosure. FIG. 13 illustrates an exemplary Table 9 showing exemplary picture header syntax table of PPS level lossless coding when pps_lossless_flag is signaled (emphases shown in boxes 1301-4304 and in italics), according to some embodiments of the present disclosure.

According to some embodiments, the lossless flag is signaled in sequence parameter sets (SPS). The following are the semantics of the disclosed SPS level lossless flag, consistent with the present embodiments:

--- sps_lossless_flag is equal to 1 specifies that the entire sequence is coding as lossless mode.
sps_lossless_flag is equal to 0 specifies that the entire sequence is not coding as lossless mode.
If sps_lossless_flag is equal to 1, the following SPS flags are not signaled and inferred to be as follows:
— Disable LMCS: sps_lmcs_enabled_flag is inferred to be 0
— Disable LFNST: sps_lfnst_enabled_flag is inferred to be 0
— Set transform size = 32: sps_max_luma_transform_size_64_flag is inferred to be 0
— Disable joint Cb-Cr mode: sps_joint_cbcr_enabled_flag is inferred to be 0
— Disable SAO: sps_sao_enabled_flag is inferred to be 0
— Disable ALF: sps_alf_enabled_flag is inferred to be 0
— Allow transform skip: sps_transform_skip_enabled_flag is inferred to be 1
— Disable MTS: sps_mts_enabled_flag is inferred to be 0
— Disable SBT: sps_sbt_enabled_flag is inferred to be 0
— Disable LFNST: sps_ltnst_enabled_flag is inferred to be 0
— Disable ISP: sps_isp_enabled_flag is inferred to be 0

---

FIG. 14 illustrates an exemplary Table 10 showing exemplary SPS syntax table for sequence level lossless coding (emphases shown in box 1401-1408 and in italics), according to some embodiments of the present disclosure. VVC 7 supports two residual coding methods: (a) regular residual coding (RRC) (b) transform skip residual coding (TSRC). In VVC 7 lossless coding, all of the coding blocks select TSRC. However, the RRC may achieve more coding gain as compared to TSRC especially in case of camera capture contents, e.g., when lossless coding is used on the current CTU. To maximize the coding gain, in some embodiments, another CTU level flag is used to signal the residual coding method of a CTU. The CTU level residual coding flag may be signaled if (and only if) the syntax element ctu_lossless_flag is 1. Following are the semantics of the disclosed CTU residual coding flag, consistent with the present embodiments:

--- ctu_rrc_flag[ xCtb >> CtbLog2SizeY ][ yCtb >> CtbLog2SizeY ] equal to 1 specifies that all of the transform blocks of the coding tree unit at luma location ( xCtb, yCtb ) select regular residual coding method.
ctu_rrc_flag[ xCtb >> CtbLog2SizeY ][ yCtb >> CtbLog2SizeY ] equal to 0 specifies that the transform blocks of the coding tree unit at luma location ( xCtb, yCtb ) select residual coding method based on the value of transform_skip_flag. If transform_skip_flag is equal 1, the transform block selects TSRC. If transform_skip_flag is equal to 0, the transform block selects RRC.
When ctu_lossless_flag [ xCtb >> CtbLog2SizeY ][ yCtb >> CtbLog2SizeY ] is 0, ctu_rrc_flag [ xCtb >> CtbLog2SizeY ][ yCtb >> CtbLog2SizeY ] is inferred to be equal to 0.
When ctu_rrc_flag [ xCtb >> CtbLog2SizeY ][ yCtb >> CtbLog2SizeY ] is not present, it is inferred to be equal to 0.

---

FIG. 15 illustrates an exemplary Table 11 showing exemplary coding_tree_unit syntax table of CTU level residual coding flag (emphases shown in box 1501 and in italics), according to some embodiments of the present disclosure. FIG. 16 illustrates an exemplary Table 12 showing exemplary transform_unit syntax of CTU level residual coding flag (emphases shown in boxes 1601-1603 and in italics), according to some embodiments of the present disclosure.

In some embodiments, both syntax elements ctu_lossless_flag and ctu_rrc_flag may be by-pass coded. In some embodiments, one of or both of syntax elements ctu_lossless_flag and ctu_rrc_flag may be context coded.

The present disclosure also provides methods for configuring the interaction between the lossless coding and various other coding tools. The details are described as follows.

According to some embodiments, if a CTU is coded as lossless mode, de-blocking filtering process of that CTU is skipped. According to some embodiments, the deblocking filter process is applied to all coding subblock edges and transform block edges of a picture, except for some types of edges. FIG. 17 illustrates exemplary types of edges to which deblocking filter process is not applied (the portions in box 1701 and in italics show the changes of the disclosed methods as compred to VVC7 draft), according to some embodiments of the present disclosure.

According to some embodiments, sample adaptive offset (SAO) is disabled for a CTU if lossless coding is used. SAO is the process of adding offset to de-blocked pixel values according to SAO type—e.g., based on edge direction/shape (Edge Offset) and pixel level (Band Offset) or unchanged (OFF). The SAO process is not mathematically lossless. Therefore, for lossless CTU, it is proposed to disable SAO. If the syntax element ctu_lossless_flag is equal to 1, all of the SAO related syntaxes of that CTU (such as syntax elements sao_merge_left_flag, sao_merge_up_flag, sao_type_idx_luma, sao_type_idx_chroma) are inferred to be 0. FIG. 18 illustrates an exemplary Table 13 showing exemplary coding_tree_unit syntax table to disable SAO (emphases shown in box 1801 and in italics), according to some embodiments of the present disclosure.

According to some embodiments, an adaptive loop filter (ALF) process is disabled for a CTU if lossless coding is used. In VVC, an ALF with block-based filter adaption is applied. Similar to de-blocking and SAO, ALF process is not mathematically lossless. Therefore, in order to achieve lossless coding of a CTU, it is proposed to disable ALF. FIG. 19 illustrates an exemplary Table 14 showing exemplary coding tree unit syntax to disable ALF (emphases shown in boxes 1901-1902 and in italics), according to some embodiments of the present disclosure. If syntax element ctu_lossless_flag of a CTU is equal to 1, syntax element alf_ctb_flag of all color components of that CTU are inferred to be zeros.

According to some embodiments, luma mapping with chroma scaling (LMCS) is disabled for a CTU if lossless coding is used. In VVC, a coding tool called the luma mapping with chroma scaling (LMCS) is added as a new processing block before the loop filters. LMCS has two main components: 1) in-loop mapping of the luma component based on adaptive piecewise linear models; 2) for the chroma components, luma-dependent chroma residual scaling is applied.

In some embodiments, if a CTU is coded as lossless mode, mapping of luma and chroma residual scaling are disabled.

FIG. 20 illustrates an exemplary derivation of variable invLumaSample (emphases in box 2001 and in italics), according to some embodiments of the present disclosure.

Similarly, luma dependent chroma residual scaling process for chroma samples is disabled for lossless CTU. FIG. 21 illustrate exemplary conditions to enable/disable chroma residual scaling (emphases in box 2101 and in italics), according to some embodiments of the present disclosure.

According to some embodiments, sub block transform (SBT) is disabled for a CTU if lossless coding is used. In VVC, SBT is introduced for an inter-predicted CU. In this transform mode, only a sub-part of the residual block is coded for the CU. When inter-predicted CU with cu_cbf equal to 1, cu_sbt_flag may be signaled to indicate whether the whole residual block or a sub-part of the residual block is coded. In the proposed method, if the coding tree unit lossless flag ctu_lossless_flag is equal to 1, SBT is not allowed for a coding unit belongs to that CTU. FIG. 22 illustrates an exemplary Table 15 showing exemplary coding unit syntax of a method to disable SBT for lossless CTU (emphases shown in box 2201 and in italics), according to some embodiments of the present disclosure.

According to some embodiments, signaling of Multiple Transform Selection (MTS) index is disabled for a CTU if lossless coding is used. In VVC7, in addition to DCT-II, an MTS scheme is used for residual coding both inter and intra coded blocks. It uses multiple selected transforms from the DCT8/DST7. In some embodiments, signaling of the MIS index is disabled if the current CTU is a lossless CTU, because such signaling is redundant as no transform is needed in the case of lossless CTU. FIG. 23 illustrates an exemplary Table 16 showing exemplary coding unit syntax to disable MTS of the lossless CTU, according to some embodiments of the present disclosure. Table 16 shows the related changes in the coding unit syntax table (emphases shown in box 2301 and in italics).

According to some embodiments, signaling of low-frequency non-separable transform (LFNST) index is disabled for a CTU if lossless coding is used. In VVC, LFNST, which is known as reduced secondary transform, is applied between forward primary transform and quantization (at encoder) and between de-quantization and inverse primary transform (at decoder side). In some embodiments, similar to MTS, signaling of LFNST index is also disabled for a lossless CTU. FIG. 24 illustrates an exemplary Table 17 showing exemplary coding unit syntax to disable LFNST for a lossless CTU (emphases shown in box 2401 and in italics), according to some embodiments of the present disclosure.

According to some embodiments, joint Cb-Cr mode is disabled for a CTU if lossless coding is used. In VVC, joint Cb-Cr mode is not mathematically lossless. Therefore, it is proposed to disable joint Cb-Cr mode for a lossless CTU. FIG. 25 illustrates an exemplary Table 18 showing exemplary part of transform unit syntax table to disable joint_cr_cr mode (emphases shown in box 2501 and in italics), according to some embodiments of the present disclosure.

According to some embodiments. Intra Subpartition (ISP) mode is disabled for a CTU if lossless coding is used. FIG. 26 illustrates an exemplary Table 19 showing exemplary coding unit syntax table to disable ISP mode for a lossless CTU (emphases shown in box 2601 and in italics), according to some embodiments of the present disclosure.

According to some embodiments, a lossless CTU always select transform skip mode. Accordingly, if a CTU is lossless coded, transform_skip_flag of that CTU is not signaled and interred to be 1. FIG. 27 illustrates an exemplary Table 20 showing exemplary transform unit syntax of transform_skip_flag signaling, according to some embodiments of the present disclosure. Table 20 shows the transform unit syntax of a method where transform_skip_flag is signaled if ctu_lossless_flag is equal to 0 (emphases shown in boxes 2701-2706 and in italics).

Figure 28:
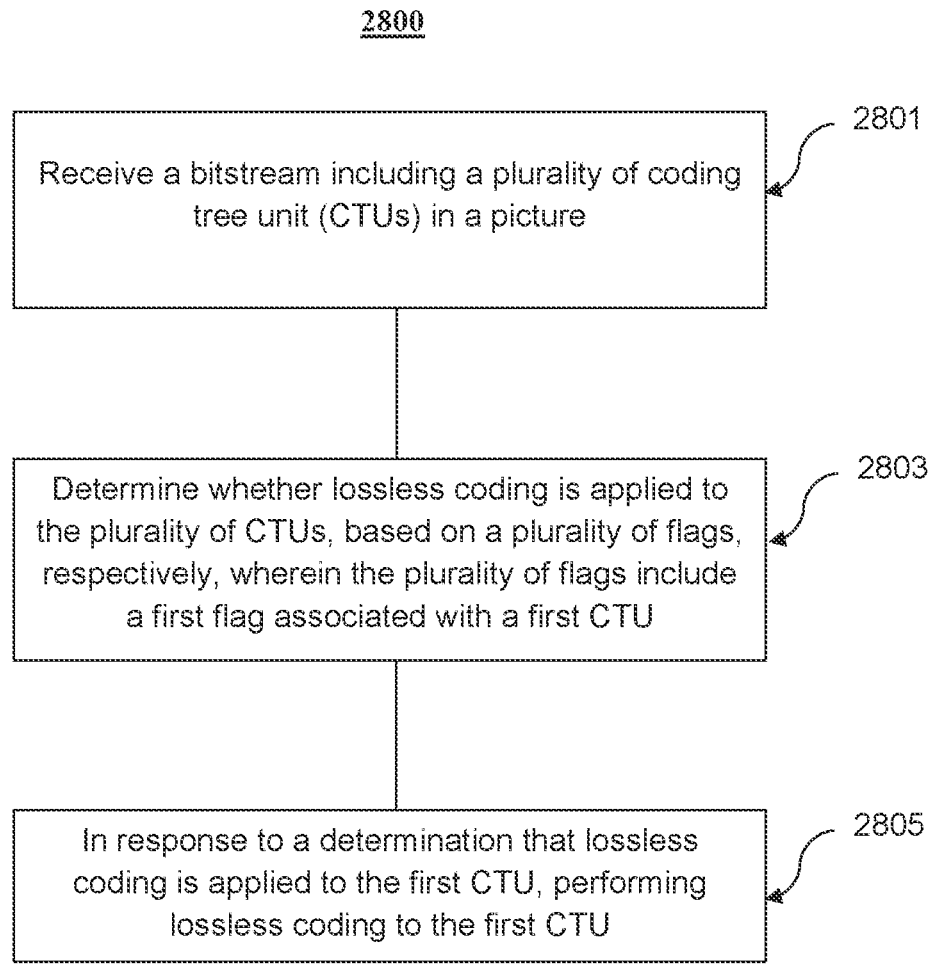
FIG. 28 illustrates a flowchart of an exemplary video processing method, according to some embodiments of the present disclosure.

FIG. 28 illustrates a flowchart of an exemplary video processing method 2800, according to some embodiments of the present disclosure. In some embodiments, method 2800, can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 2800. In some embodiments, method 2800 can be implemented by a computer program product, embodied in a computer-readable medium, including computer-executable instructions, such as program code, executed by computers (e.g., apparatus 400 of FIG. 4).

At step 2801, a bitstream including a plurality of coding tree unit (CTUs) in a picture can be received. For example, video bitstream 228 of FIG. 2A, FIG. 2B, FIG. 3A, FIG. 3B can be received.

At step 2803, a determination can be made on whether lossless coding is applied to the plurality of CTUs, based on a plurality of flags, respectively. The plurality of flags can include a first flag associated with a first CTU. In some embodiments, each of the plurality of flags can be a CTU level lossless flag, e.g., ctu_lossless_flag as shown in Table 1 of FIG. 5. In some embodiments, the first flag can be a slice level lossless flag (e.g., slice_lossless_flag as shown in Table 4 of FIG. 8), a picture level lossless flag (e.g., pic_lossless_flag as shown in Table 6 of FIG. 10), a PPS level lossless flag (e.g., pps_lossless_flag as shown in Table 8 of FIG. 12), or a SPS level lossless flag (e.g., sps_lossless_flag as shown in Table 10 of FIG. 14).

At step 2805, in response to a determination that lossless coding is applied to the first CTU, lossless coding to the first CTU can be performed. In some embodiments, method 2800 can include in response to the first flag being not signaled in the bitstream, determining that lossy coding is applied to the first CTU.

In some embodiments, method 2800 can include in response to the determination that lossless coding is applied to the first CTU, determining a residual coding method applied to transform blocks of the first CTU, based on a second flag (e.g., ctu_rrc_flag as shown in Table 11 of FIG. 15, Table 12 of FIG. 16, Table 13 of FIG. 18, or Table 14 of FIG. 19). In response to the second flag having a first value (e.g., 1), method 2800 can determine that a first residual coding method (e.g., regular residual coding method) is applied to the transform blocks. In response to the second flag having a second value (e.g., 0), method 2800 can determine a residual coding method applied to the transform blocks, based on a third flag (e.g., transform_skip_flag). In response to the third flag having a third value (e.g., 0), method 2800 can determine that the first residual coding method (e.g., regular residual coding method) is applied to the transform blocks. In response to the third flag having a fourth value (e.g., 1), determining that a second residual coding method (e.g., transform skip residual coding method) is applied to the transform blocks.

In some embodiments, method 2800 can include in response to the determination that lossless coding is applied to the first CTU, coding the first CTU in a transform skip mode regardless of whether a transform-skip flag for the first CTU is signaled in the bitstream.

In some embodiments, method 2800 can include determining whether the first flag (e.g., ctu_lossless_flag as shown in Table 1 of FIG. 5) is signaled in the bitstream based on a fourth flag. The fourth flag is a SPS level flag (e.g., sps_ctu_lossless_present_flag as shown in Table 2 of FIG. 6). In response to the fourth flag being not signaled in the bitstream, method 2800 can determine that the bitstream does not include the first flag.

In some embodiments, method 2800 can include: in response to a fifth flag having a fifth value, determining that lossless coding is applied to a picture slice including the first CTU, or in response to the fifth flag having a sixth value, determining that the first flag is signaled in the bitstream. The fifth flag can be a slice level lossless flag (e.g., slice lossless flag as shown in Table 4 of FIG. 8 and Table 5 of FIG. 9).

In some embodiments, method 2800 can include: in response to a sixth flag having a seventh value, determining that lossless coding is applied to a picture including the first CTU, or in response to the sixth flag having an eighth value, determining that the fifth flag is signaled in the bitstream. The sixth flag can be a picture level lossless flag (e.g., pic_lossless_flag as shown in Table 6 of FIG. 10 and Table 7 of FIG. 11).

In some embodiments, method 2800 can include: in response to a seventh flag having a ninth value, determining that lossless coding is applied to a picture associated with a PPS and including the first CTU, or in response to the seventh flag having a tenth value, determining that the sixth flag is signaled in the bitstream. The seventh flag can be a PPS level lossless flag (e.g., pps_lossless_flag as shown in Table 8 of FIG. 12 and Table 9 of FIG. 13).

In some embodiments, method 2800 can include: in response to an eighth flag having an eleventh value, determining that lossless coding is applied to a picture associated with a SPS and including the first CTU, or in response to the eighth flag having a twelfth value, determining that lossy coding is applied to one or more first CTUs associated with the SPS. The eighth flag can be a SPS level lossless flag (e.g., sps_lossless_flag as shown in Table 10 of FIG. 14). In some embodiment, in response to the eighth flag having a twelfth value, CTU level lossless flag, a slice level lossless flag, a picture level lossless flag, or a PPS level lossless flag can be signaled to indicate whether a first CTU, a slice, or a picture can be coded with a lossy coding mode.

In some embodiments, method 2800 can include in response to the determination that lossless coding is applied to the first CTU, disabling, for the first CTU, one or more of: a de-clocking filtering process; an SAO process; an ALF process; LMCS; lama dependent chroma residual scaling process; SBT; signaling of MTS index; signaling of LFNST index; a joint Cb-Cr mode; or an ISP mode.

To achieve mixed coding, in which one part of an image is lossless coded and another part of the image is lossy coded, LMCS needs to be disabled for a whole picture even including the lossy part of the picture, because the current VVC design does not provide a way to control the LMCS locally. The present disclosure also provides embodiments for controlling the LMCS locally.

In some embodiments, a CTB level LMCS flag can be signaled to control LMCS in the CTB level. The semantics of the proposed CTB level flag are given below.

"lmcs_ctb_luma_flag, [xCtb>>CtbLog2SizeY][yCtb>>CtbLog2SizeY]" equal to 1 specifies that the luma mapping with chroma scaling is applied to the luma coding tree block at luma location (xCtb, yCtb).

"lmes_ctb_luma_flag[cIdx][xCtb>>CtbLog2SizeY][yCtb>>CtbLog2SizeY]" equal to 0 specifies that the luma mapping with chroma scaling is not applied to the luma coding tree block the coding tree block at luma location (xCtb, yCtb).

When "lmcs_ctb_luma_flag[cIdx][xCtb>>CtbLog2SizeY][yCtb>>CtbLog2SizeY]" is not present, it is inferred to be equal to 0.

"lmcs_ctb_chroma_residual_scale_flag [xCtb>>CtbLog2SizeY][yCtb>>CtbLog2SizeY]" equal to 1 specifies that chroma residual scaling is applied to the chroma coding tree block at Hanna location (xCtb, yCtb).

"lmcs_ctb_chroma_residual_scale_flag [xCtb>>CtbLog2SizeY][yCtb>>CtbLog2SizeY]" equal to 0 specifies that the chroma residual scaling is not applied to the chroma coding tree block the coding tree block at luma location xCtb, yCtb).

When "lmcs_ctb_chroma_residual_scale_flag [xCtb>>CtbLog2SizeY][yCtb>>CtbLog2SizeY]" is not present, it is inferred to be equal to 0.

FIG. 29 illustrates an exemplary Table 21 showing exemplary syntax for controlling luma mapping with chroma scaling (LMCS) at the CTB level, according to some embodiments of the present disclosure. Emphases of the syntax are shown in box 2901 and in italics.

In picture reconstruction with mapping process for luma samples, input to this process includes the following: current picture; a variable nCurrSw specifying the block width; a variable nCurrSh specifying the block height; an (nCurrSw)×(nCurrSh) array predSamples specifying the luma predicted samples of the current block; and an (nCurrSw)×(nCurrSh) array resSamples specifying the luma residual samples of the current block. Moreover, consistent with the disclosed embodiment, the input to the process also includes the following requirement: lmcs_ctb_luma_flag [xCurr>>CtbLog2SizeY][yCurr>>CtbLog2SizeY] of the luma coding tree block.

Outputs of this process is a reconstructed luma picture sample array recSamples:

If lmcs_ctb_luma_flag[xCurr>>CtbLog2SizeY][yCurr>>CtbLog2SizeY] is equal to 0, the (nCurrSw)×(nCurrSh) block of the reconstructed samples recSamples at location (xCurr, yCurr) is derived as follows for i=0 . . . nCurrSw−1, j=0 . . . nCurrSh−1:
recSamples[xCurr+i][yCurr+j]=Clip1(predSamples[i][j]+resSamples[i][j])

Otherwise, the (nCurrSw)×(nCurrSh) array of mapped predicted luma samples predMapSamples is derived as follows:
If one of the following conditions is true, predMapSamples[i][j] is set equal to predSamples[i][j] for i=0 . . . nCurrSw−1, j=0 . . . nCurrSh−1:

CuPredMode[0][xCurr][yCurr] is equal to MODE_INTRA.

CuPredMode[0][xCurr][yCurr] is equal to MODE_IBC.

CuPredMode[0][xCurr][yCurr] is equal to MODE_PLT.

CuPredMode[0][xCurr][yCurr] is equal to MODE_INTER and ciip_flag[xCurr][yCurr] is equal to 1.

Otherwise (CuPredMode[0][xCurr][yCurr] is equal to MODE_INTER and ciip_flag[xCurr][yCurr] is equal to 0), the following applies:

$idxY = predSamples[i][j] >> \log 2(OrgCW)$ $predMapSamples[i][j] = LmcsPivot[idxY] + ScaleCoeff[idxY]*(predSamples[i][j]-InputPivot[idxY]) + (1<<10))>>11$ with i=0 . . . nCurrSw-1, j=0 . . . nCurrSh-1

The reconstructed luma picture sample recSamples is derived as follows:

$recSamples[xCurr+i][yCurr+j] = Clip1(predMapSamples[i][j] + resSamples[i][j])$ with i=0 . . . nCurrSw-1, j=0 . . . nCurrSh-1

In picture reconstruction with luma dependent chroma residual scaling process for chroma samples, input to this process includes the following: a chroma location (xCurr, yCurr) of the top-left chroma sample of the current chroma transform block relative to the top-left chroma sample of the current picture; a variable nCurrSw specifying the chroma transform block width; a variable nCurrSh specifying the chroma transform block height; a variable tuCbfChroma specifying the coded block flag of the current chroma transform block; an (nCurrSw)×(nCurrSh) array predSamples specifying the chroma prediction samples of the current block; an (nCurrSw)×(nCurrSh) array resSamples specifying the chroma residual samples of the current block; a location (xCtb, yCtb) specifying the top-left luma sample of the current coding tree unit relative to the top left sample of the current picture component; lmcs_ctb_chroma_residual_scale_flag
[xCtb>>CtbLog2SizeY][yCtb>>CtbLog2SizeY] of the coding tree block.

Output of this process is a reconstructed chroma picture sample array recSamples.

The variable sizeY is set equal to Min(CtbSizeY, 64).

The reconstructed chroma picture sample recSamples is derived as follows for i=0 . . . nCurrSw-1, j=0 . . . nCurrSh-1.

If one of the following conditions is true, recSamples[i][yCurr+j] is set equal to Clip1(predSamples[i][j]+resSamples[i][j]):

pic_chroma_residual_scale_flag is equal to 0.

nCurrSw*nCurrSh is less than or equal to 4.

tu_cbf_cb [xCurr][yCurr] is equal to 0 and tu_cbf_cr [xCurr][yCurr] is equal to 0.

lmcs_ctb_chroma_residual_scale_flag
[xCtb>>CtbLog2SizeY][yCtb>>CtbLog2SizeY] is equal to 0

Otherwise, the following applies:

The current luma location (xCurrY, yCurrY) is derived as follows:

$(xCurrY,yCurrY) = (xCurr*SubWidthC, yCurr*SubHeightC)$

The luma location (xCuCb, yCuCb) is specified as the) p-left luma sample location of the coding unit that contains the luma sample at (xCurrY/sizeY*sizeY, yCurrY/sizeY*sizeY).

The variables availL and availT are derived as follows:

The derivation process for neighbouring block availability as specified in clause 6.4.4 is invoked with the location (xCurr, yCurr) set equal to (xCuCb, yCuCb), the neighbouring luma location (xNbY, yNbY) set equal to (xCuCb-1, yCuCb), checkPredModeY set equal to FALSE, and cIdx set equal to 0 as inputs, and the output is assigned to availL.

The derivation process for neighbouring block availability as specified in clause 6.4.4 is invoked with the location (xCurr, yCurr) set equal to (xCuCb, yCuCb), the neighbouring luma location (xNbY, yNbY) set equal to (xCuCb, yCuCb-1), checkPredModeY set equal to FALSE, and cIdx set equal to 0 as inputs, and the output is assigned to availT.

The variable currPic specifies the array of reconstructed luma samples in the current picture.

For the derivation of the variable varScale the following ordered steps apply:

1. The variable invAvgLuma is derived as follows:

The array recLuma[i] with i=0 . . . (2*sizeY-1) and the variable cnt are derived as follows:

The variable cnt is set equal to 0.

When availL is equal to TRUE, the array recLuma[i] with i=0 . . . sizeY-1 is set equal to currPic[xCuCb-1][Min(yCuCb+i, pic_height_in_luma_samples-1)] with i=0 . . . sizeY-1, and cnt is set equal to sizeY, When availT is equal to TRUE, the array recLuma[cnt+i] with i=0 . . . sizeY-1 is set equal to currPic[Min(xCuCb+i, pic_width_in_luma_samples-1)][yCuCb-1] with i=0 . . . sizeY-1, and cnt is set equal to (cnt+sizeY).

The variable invAvgLuma is derived as follows:

if cnt is greater than 0, the following applies:

$invAvgLuma = Clip1((\Sigma_{k=0}^{cnt-1} recLuma[k] + (cnt>>1))>>\log 2(cnt))$

Otherwise (cnt is equal to 0), the following applies:

$invAvgLuma = 1<<(BitDepth-1)$

2. The variable idxYInv is derived by invoking the identification of piece-wise function index process for a luma sample as specified in clause 8.8.2.3 with the variable lumaSample set equal to invAvgLuma as the input and idxYInv as the output.

3. The variable varScale is derived as follows:

$varScale = ChromaScaleCoeff[idxYInv]$

The reconstructed chroma picture sample array recSamples is derived as follows:

If tuCbfChroma is equal to 1, the following applies:

$resSamples[i][j] = Clip3(-(1<<BitDepth),(1<<BitDepth)-1,resSamples[i][j])$ $recSamples[xCurr+i][yCurr+j] = Clip1(predSamples[i][j] + Sign(resSamples[i][j])*((Abs(resSamples[i][j])*varScale+(1<<10))>>11))$ Otherwise (tuCbfChroma is equal to 0), the following applies:

$recSamples[xCurr+i][yCurr+j] = Clip1(predSamples[i][j])$

In inverse mapping process for a luma sample, input to this process is as below:
a luma sample lumaSample.
a location (xCtb, yCtb) specifying the top-left luma sample of the current coding tree unit relative to the top left sample of the current picture component,
lmes_ctb_luma_flag[0][xCtb>>CtbLog2SizeY] [yCtb>>CtbLog2SizeY] of the coding tree unit
Output of this process is a modified luma sample invLumaSample
The value of invLumaSample is derived as follows:
If pic_lmcs_enabled_flag of the slice that contains the luma sample lumaSample is equal to 1, and lmcs_ctb_luma_flag[xCtb>>CtbLog2SizeY] [yCtb>>CtbLog2SizeY] is not equal to zero the following ordered steps apply:
The variable idxYInv is derived by invoking the identification of piece-wise function index process for a luma sample as specified in clause 8.8.2.3 with lumaSample as the input and idxYInv as the output.
The variable invSample is derived as follows:

invSample=InputPivot[*idxYInv*]+(InvScaleCoeff[*idxYInv*]*(lumaSample−*Lmcs*Pivot[*idxYInv*])+ (1<<10))>>11

The inverse mapped luma sample invLumaSample is derived as follows:

invLumaSample=Clip1(invSample)

Otherwise, invLumaSample is set equal to lumaSample

In some embodiments, the proposed LMCS control flags are signaled at slice header. A flag called slice_lmcs_lima_enabled_flag is signaled in each slice header to control whether LMCS is enabled for that slice or not. FIG. 30 illustrates an exemplary Table 22 showing exemplary slice header syntax for signaling LMCS control flags at slice level, according to some embodiments of the present disclosure.

"slice_lmes_luma_enabled_flag" equal to 1 specifies that luma mapping with chroma scaling is enabled for the luma component of the slices.

"slice_lmcs_luma_enabled_flag" equal to 0 specifies that luma mapping with chroma scaling is not applied to the luma component of the slice. When "pic_lmcs_enabled_flag" is not present, its value is inferred to be equal to 0.

"slice_chroma_residual_scale_flag" equal to 1 specifies that chroma residual scaling is enabled for the slices. "slice_chroma_residual_scale_flag" equal to 0 specifies that chroma residual scaling is disabled for the slice.

In some embodiments, the proposed slice level LMCS control flags are signaled at slice header to control LMCS for both luma and chroma. For instance, slice_chroma_residual_scale_flag being equal to 1 indicate that LMCS is enable for both luma and chroma. If slice_chroma_residual_scale_flag is equal to 0, LMCS is disabled for both luma and chroma of that slice.

The embodiments of the present disclosure may further be described using the following clauses:

1. A video processing method, comprising:
receiving a bitstream comprising a plurality of coding tree unit (CTUs) in a picture;
determining whether lossless coding is applied to the plurality of CTUs, based on a plurality of flags, respectively, wherein the plurality of flags comprise a first flag associated with a first CTU, and the method further comprises:

in response to a determination that lossless coding is applied to the first CTU, performing lossless coding to the first CTU.

2. The method of clause 1, wherein each of the plurality of flags is a CTU level lossless flag.

3. The method of any one of clauses 1 and 2, further comprising:
in response to the first flag being not signaled in the bitstream, determining that lossy coding is applied to the first CTU.

4. The method of any one of clauses 1-3, further comprising:
in response to the determination that lossless coding is applied to the first CTU, determining, based on a second flag, a residual coding method applied to transform blocks of the first CTU.

5. The method of clause 4, further comprising:
in response to the second flag having a first value, determining that a first residual coding method is applied to the transform blocks.

6. The method of clause 4, further comprising:
in response to the second flag having a second value, determining a value of a third flag, and
in response to the third flag having a third value, determining that a first residual coding method is applied to the transform blocks, or
in response to the third flag having a fourth value, determining that a second residual coding method is applied to the transform blocks.

7. The method of any one of clauses 1-6, further comprising:
in response to the determination that lossless coding is applied to the first CTU, coding the first CTU in a transform skip mode regardless of whether a transform-skip flag for the first CTU is signaled in the bitstream.

8. The method of any one of clauses 1-7, further comprising:
determining, based on a fourth flag, whether the first flag is signaled in the bitstream, the fourth flag being a sequence parameter sets (SPS) level flag.

9. The method of clause 8, further comprising:
in response to the fourth flag being not signaled in the bitstream, determining that the bitstream does not comprise the first flag.

10. The method of any one of clauses 1-9, further comprising:
in response to a fifth flag having a fifth value, determining that lossless coding is applied to a picture slice including the first CTU; or
in response to the fifth flag having a sixth value, determining that the first flag is signaled in the bitstream,
wherein the fifth flag is a slice level lossless flag.

11. The method of clause 10, further comprising:
in response to a sixth flag having a seventh value, determining that lossless coding is applied to a picture including the first CTU; or
in response to the sixth flag having an eighth value, determining that the fifth flag is signaled in the bitstream,
wherein the sixth flag is a picture level lossless flag.

12. The method of clause 11, further comprising:
in response to a seventh flag having a ninth value, determining that lossless coding is applied to a picture associated with a picture parameter sets (PPS) and including the first CTU; or
in response to the seventh flag having a tenth value, determining that the sixth flag is signaled in the bitstream,
wherein the seventh flag is a PPS level lossless flag.

13. The method of any of clauses 1-12, further comprising:
in response to an eighth flag having an eleventh value, determining that lossless coding is applied to a picture associated with a SPS and including the first CTU; or
in response to the eighth flag having a twelfth value, determining that lossy coding is applied to one or more CTUs associated with the SPS,
wherein the eighth flag is a SPS level lossless flag.

14. The method of clause 1, wherein the first flag is a slice level lossless flag, a picture level lossless flag, a PPS level lossless flag, or a SPS level lossless flag.

15. The method of any one of clauses 1-14, further comprising:
in response to the determination that lossless coding is applied to the first CTU, disabling, for the first CTU, one or more of:
a de-clocking filtering process;
a sample adaptive offset (SAO) process;
an adaptive loop filter (ALF) process;
luma mapping with chroma scaling (LMCS);
luma dependent chroma residual scaling process;
sub block transform (SBT);
signaling of Multiple Transform Selection (MTS) index;
signaling of low-frequency non-separable transform (LFNST) index;
a joint Cb-Cr mode; or
an Intra Subpartition (ISP) mode.

16. A video processing apparatus, comprising:
at least one memory for storing instructions; and
at least one processor configured to execute the instructions to cause the apparatus to perform:
receiving a bitstream comprising a plurality of coding tree unit (CPUs) in a picture;
determining whether lossless coding is applied to the plurality of CTUs, based on a plurality of flags, respectively,
wherein the plurality of flags comprise a first flag associated with a first CTU, and the method further comprises:
in response to a determination that lossless coding is applied to the first CTU, performing lossless coding to the first CTU.

17. The apparatus of clause 16, wherein each of the plurality of flags is a CTU level lossless flag.

18. The apparatus of any one of clauses 16 and 17, wherein the at least one processor is configured to execute the instructions to cause the apparatus to perform:
in response to the first flag being not signaled in the bitstream, determining that lossy coding is applied to the first CTU.

19. The apparatus of any one of clauses 16-18, wherein the at least one processor is configured to execute the instructions to cause the apparatus to perform:
in response to the determination that lossless coding is applied to the first CTU, determining, based on a second flag, a residual coding method applied to transform blocks of the first CTU.

20. The apparatus of clause 19, wherein the at least one processor is configured to execute the instructions to cause the apparatus to perform:
in response to the second flag having a first value, determining that a first residual coding method is applied to the transform blocks.

21. The apparatus of clause 19, wherein the at least one processor is configured to execute the instructions to cause the apparatus to perform:
in response to the second flag having a second value, determining a value of a third flag; and
in response to the third flag having a third value, determining that a first residual coding method is applied to the transform blocks, or
in response to the third flag having a fourth value, determining that a second residual coding method is applied to the transform blocks.

22. The apparatus of any one of clauses 16-21, wherein the at least one processor is configured to execute the instructions to cause the apparatus to perform: in response to the determination that lossless coding is applied to the first CTU, coding the first CTU in a transform skip mode regardless of whether a transform-skip flag for the first CTU is signaled in the bitstream.

23. The apparatus of any one of clauses 16-22, wherein the at least one processor is configured to execute the instructions to cause the apparatus to perform:
determining, based on a fourth flag, whether the first flag is signaled in the bitstream, the fourth flag being a sequence parameter sets (SPS) level flag.

24. The apparatus of clause 23, wherein the at least one processor is configured to execute the instructions to cause the apparatus to perform:
in response to the fourth flag being not signaled in the bitstream, determining that the bitstream does not comprise the first flag.

25. The apparatus of any one of clauses 16-24, wherein the at least one processor is configured to execute the instructions to cause the apparatus to perform:
in response to a fifth flag having a fifth value, determining that lossless coding is applied to a picture slice including the first CTU; or
in response to the fifth flag having a sixth value, determining that the first flag is signaled in the bitstream,
wherein the fifth flag is a slice level lossless flag.

26. The apparatus of clause 25, wherein the at least one processor is configured to execute the instructions to cause the apparatus to perform:
in response to a sixth flag having a seventh value, determining that lossless coding is applied to a picture including the first CTU or
in response to the sixth flag having an eighth value, determining that the fifth flag is signaled in the bitstream,
wherein the sixth flag is a picture level lossless flag.

27. The apparatus of clause 26, wherein the at least one processor is configured to execute the instructions to cause the apparatus to perform:
in response to a seventh flag having a ninth value, determining that lossless coding is applied to a picture associated with a picture parameter sets (PPS) and including the first CTU; or
in response to the seventh flag having a tenth value, determining that the sixth flag is signaled in the bitstream,
wherein the seventh flag is a PPS level lossless flag.

28. The apparatus of any one of clauses 16-27, wherein the at least one processor is configured to execute the instructions to cause the apparatus to perform:
in response to an eighth flag having an eleventh value, determining that lossless coding is applied to a picture associated with a SPS and including the first CTU; or
in response to the eighth flag having a twelfth value, determining that lossy coding is applied to one or more CTUs associated with the SPS,
wherein the eighth flag is a SPS level lossless flag.

29. The apparatus of clause 16, wherein the first flag is a slice level lossless flag, a picture level lossless flag, a PPS level lossless flag, or a SPS level lossless flag.

30. The apparatus of any one of clauses 16-29, wherein the at least one processor is configured to execute the instructions to cause the apparatus to perform:

in response to the determination that lossless coding is applied to the first CTU, disabling, for the first CTU, one or more of:

a de-clocking filtering process;
a sample adaptive offset (SAO) process;
an adaptive loop filter (ALF) process;
luma mapping with chroma scaling (LMCS);
luma dependent chroma residual scaling process;
sub block transform (SBT);
signaling of Multiple Transform Selection (MTS) index;
signaling of low-frequency non-separable transform (LFNST) index;
a joint Cb-Cr mode; or
an Intra Subpartition (ISP) mode.

31. A non-transitory computer readable storage medium storing a set of instructions that are executable by one or more processing devices to cause a video processing apparatus to perform a method comprising:

receiving a bitstream comprising a plurality of coding tree unit (CTUs) in a picture;

determining whether lossless coding is applied to the plurality of CTUs, based on a plurality of flags, respectively, wherein the plurality of flags comprise a first flag associated with a first CTU, and the method further comprises:

in response to a determination that lossless coding is applied to the first CTU, performing lossless coding to the first CTU.

32. The non-transitory computer readable storage medium of clause 31, wherein each of the plurality of flags is a CTU level lossless flag.

33. The on-transitory computer readable storage medium of any one of clauses 31 and 32, wherein the set of instructions are executable by the one or more processing devices to cause the video processing apparatus to perform:

in response to the first flag being not signaled in the bitstream, determining that lossy coding is applied to the first CTU.

34. The non-transitory computer readable storage medium of any one of clauses 31-33, wherein the set of instructions are executable by the one or more processing devices to cause the video processing apparatus to perform:

in response to the determination that lossless coding is applied to the first CTU, determining, based on a second flag, a residual coding method applied to transform blocks of the first CTU.

35. The non-transitory computer readable storage medium of clause 34, wherein the set of instructions are executable by the one or more processing devices to cause the video processing apparatus to perform:

in response to the second flag having a first value, determining that a first residual coding method is applied to the transform blocks.

36. The non-transitory computer readable storage medium of clause 34, wherein the set of instructions are executable by the one or more processing devices to cause the video processing apparatus to perform:

in response to the second flag having a second value, determining a value of a third flag; and in response to the third flag having a third value, determining that a first residual coding method is applied to the transform blocks, or in response to the third flag having a fourth value, determining that a second residual coding method is applied to the transform blocks.

37. The non-transitory computer readable storage medium of any one of clauses 31-36, wherein the set of instructions are executable by the one or more processing devices to cause the video processing apparatus to perform:

in response to the determination that lossless coding is applied to the first CTU, coding the first CTU in a transform skip mode regardless of whether a transform-skip flag for the first CTU is signaled in the bitstream.

38. The non-transitory computer readable storage medium of any one of clauses 31-37, wherein the set of instructions are executable by the one or more processing devices to cause the video processing apparatus to perform:

determining, based on a fourth flag, whether the first flag is signaled in the bitstream, the fourth flag being a sequence parameter sets (SPS) level flag.

39. The non-transitory computer readable storage medium of clause 38, wherein the set of instructions are executable by the one or more processing devices to cause the video processing apparatus to perform:

in response to the fourth flag being not signaled in the bitstream, determining that the bitstream does not comprise the first flag.

40. The non-transitory computer readable storage medium of any one of clauses 31-39, wherein the set of instructions are executable by the one or more processing devices to cause the video processing apparatus to perform:

in response to a fifth flag having a fifth value, determining that lossless coding is applied to a picture slice including the first CTU; or in response to the fifth flag having a sixth value, determining that the first flag is signaled in the bitstream, wherein the fifth flag is a slice level lossless flag.

41. The non-transitory computer readable storage medium of 40, wherein the set of instructions are executable by the one or more processing devices to cause the video processing apparatus to perform:

in response to a sixth flag having a seventh value, determining that lossless coding is applied to a picture including the first CTU; or in response to the sixth flag having an eighth value, determining that the fifth flag is signaled in the bitstream, wherein the sixth flag is a picture level lossless flag.

42. The non-transitory computer readable storage medium of clause 41, wherein the set of instructions are executable by the one or more processing devices to cause the video processing apparatus to perform:

in response to a seventh flag having a ninth value, determining that lossless coding is applied to a picture associated with a picture parameter sets (PPS) and including the first CTU; or in response to the seventh flag having a tenth value, determining that the sixth flag is signaled in the bitstream, wherein the seventh flag is a PPS level lossless flag.

43. The non-transitory computer readable storage medium of any one of clauses 31-42, wherein the set of instructions are executable by the one or more processing devices to cause the video processing apparatus to perform:

in response to an eighth flag having an eleventh value, determining that lossless coding is applied to a picture associated with a SPS and including the first CTU; or in response to the eighth flag having a twelfth value, determining that lossy coding is applied to one or more CTUs associated with the SPS, wherein the eighth flag is a SPS level lossless flag.

44. The non-transitory computer readable storage medium of clause 31, wherein the first flag is a slice level lossless flag, a picture level lossless flag, a PPS level lossless flag, or a SPS level lossless flag.

45. The non-transitory computer readable storage medium of any one of clauses 31-44, wherein the set of instructions are executable by the one or more processing devices to cause the video processing apparatus to perform:

in response to the determination that lossless coding is applied to the first CTU, disabling, for the first CTU, one or more of:

a de-clocking filtering process;
a sample adaptive offset (SAO) process;
an adaptive loop filter (ALF) process;
luma mapping with chroma scaling (LMCS);
luma dependent chroma residual scaling process;
sub block transform (SBT);
signaling of Multiple Transform Selection (MTS) index;
signaling of low-frequency non-separable transform (LFNST) index;
a joint Cb-Cr mode; or
an Intra Subpartition (ISP) mode.

46. A video processing method, comprising:
receiving a bitstream representing a picture sequence, the bitstream including a parameter set for the picture sequence;
determining whether lama mapping with chroma scaling (LMCS) is enabled for the picture sequence;
in response to the determination that LMCS is enabled for the picture sequence, determining if LMCS is enabled for a coding tree block (CTB) of the picture sequence.

47. The method of clause 46, further comprising:
in response to the determination that LMCS is enabled for the CTB of the picture sequence, applying LMCS on the CTB.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video processing method, comprising:
receiving a bitstream comprising a plurality of coding tree unit (CTUs) in a picture;
determining whether lossless coding is applied to the plurality of CTUs, based on a plurality of flags, respectively,
wherein the plurality of flags comprise a first flag associated with a first CTU and each of the plurality of flags is a CTU level lossless flag, and the method further comprises:
in response to a determination that lossless coding is applied to the first CTU, performing lossless coding to the first CTU.

2. The method of claim 1, further comprising:
in response to the first flag being not signaled in the bitstream, determining that lossy coding is applied to the first CTU.

3. The method of claim 1, further comprising:
in response to the determination that lossless coding is applied to the first CTU, determining, based on a second flag, a residual coding method applied to transform blocks of the first CTU.

4. The method of claim 3, further comprising:
in response to the second flag having a first value, determining that a first residual coding method is applied to the transform blocks.

5. The method of claim 3, further comprising:
in response to the second flag having a second value, determining a value of a third flag; and in response to the third flag having a third value, determining that a first residual coding method is applied to the transform blocks, or in response to the third flag having a fourth value, determining that a second residual coding method is applied to the transform blocks.

6. The method of claim 1, further comprising:
in response to the determination that lossless coding is applied to the first CTU, coding the first CTU in a transform skip mode regardless of whether a transform-skip flag for the first CTU is signaled in the bitstream.

7. The method of claim 1, further comprising:
determining, based on a fourth flag, whether the first flag is signaled in the bitstream, the fourth flag being a sequence parameter sets (SPS) level flag.

8. The method of claim 7, further comprising:
in response to the fourth flag being not signaled in the bitstream, determining that the bitstream does not comprise the first flag.

9. The method of claim 1, further comprising:
in response to a fifth flag having a fifth value, determining that lossless coding is applied to a picture slice including the first CTU; or in response to the fifth flag having a sixth value, determining that the first flag is signaled in the bitstream, wherein the fifth flag is a slice level lossless flag.

10. The method of claim 9, further comprising:
in response to a sixth flag having a seventh value, determining that lossless coding is applied to a picture including the first CTU; or in response to the sixth flag having an eighth value, determining that the fifth flag is signaled in the bitstream, wherein the sixth flag is a picture level lossless flag.

11. The method of claim 10, further comprising:
in response to a seventh flag having a ninth value, determining that lossless coding is applied to a picture associated with a picture parameter sets (PPS) and including the first CTU; or in response to the seventh flag having a tenth value, determining that the sixth flag is signaled in the bitstream, wherein the seventh flag is a PPS level lossless flag.

12. The method of claim 1, further comprising:
in response to an eighth flag having an eleventh value, determining that lossless coding is applied to a picture associated with a SPS and including the first CTU; or in response to the eighth flag having a twelfth value, determining that lossy coding is applied to one or more CTUs associated with the SPS, wherein the eighth flag is a SPS level lossless flag.

13. The method of claim 1, further comprising:
in response to the determination that lossless coding is applied to the first CTU, disabling, for the first CTU, one or more of:
a de-blocking filtering process;
a sample adaptive offset (SAO) process;
an adaptive loop filter (ALF) process;
luma mapping with chroma scaling (LMCS);
luma dependent chroma residual scaling process;
sub block transform (SBT);
signaling of Multiple Transform Selection (MTS) index;
signaling of low-frequency non-separable transform (LFNST) index;
a joint Cb-Cr mode; or
an Intra Subpartition (ISP) mode.

14. A video processing apparatus, comprising:
at least one memory for storing instructions; and
at least one processor configured to execute the instructions to cause the apparatus to perform:
receiving a bitstream comprising a plurality of coding tree unit (CTUs) in a picture;
determining whether lossless coding is applied to the plurality of CTUs, based on a plurality of flags, respectively,
wherein the plurality of flags comprise a first flag associated with a first CTU and each of the plurality of flags is a CTU level lossless flag, and the method further comprises:
in response to a determination that lossless coding is applied to the first CTU, performing lossless coding to the first CTU.

15. A non-transitory computer readable storage medium storing a set of instructions that are executable by one or more processing devices to cause a video processing apparatus to perform a method comprising:
receiving a bitstream comprising a plurality of coding tree unit (CTUs) in a picture;
determining whether lossless coding is applied to the plurality of CTUs, based on a plurality of flags, respectively,
wherein the plurality of flags comprise a first flag associated with a first CTU and each of the plurality of flags is a CTU level lossless flag, and the method further comprises:
in response to a determination that lossless coding is applied to the first CTU, performing lossless coding to the first CTU.

16. The non-transitory computer readable storage medium of claim 15, wherein the set of instructions are executable by the one or more processing devices to cause the video processing apparatus to perform:
in response to the first flag being not signaled in the bitstream, determining that lossy coding is applied to the first CTU.

* * * * *